(12) United States Patent
Campbell et al.

(10) Patent No.: US 12,713,373 B2
(45) Date of Patent: Aug. 18, 2026

(54) WIRELESS MICROPHONE SYNCHRONIZATION FOR BTOIP TWS EARBUDS

(71) Applicant: QUALCOMM INCORPORATED, San Diego, CA (US)

(72) Inventors: Benjamin James Campbell, Bury St Edmunds (GB); Morio Taneda, Cambridge (GB); Mayank Batra, Cambridge (GB); Hemant Gupta, Hyderabad (IN)

(73) Assignee: QUALCOMM Incorporated, San Diego, CA (US)

(*) Notice: Subject to any disclaimer, the term of this patent is extended or adjusted under 35 U.S.C. 154(b) by 199 days.

(21) Appl. No.: 18/712,229

(22) PCT Filed: Mar. 18, 2022

(86) PCT No.: PCT/US2022/020962

§ 371 (c)(1),
(2) Date: May 21, 2024

(87) PCT Pub. No.: WO2023/146565

PCT Pub. Date: Aug. 3, 2023

(65) Prior Publication Data

US 2025/0016701 A1 Jan. 9, 2025

(30) Foreign Application Priority Data

Jan. 26, 2022 (IN) ............................ 202241004351

(51) Int. Cl.
*H04W 56/00* (2009.01)
*H04L 65/65* (2022.01)
(Continued)

(52) U.S. Cl.
CPC ......... *H04W 56/0015* (2013.01); *H04L 65/65* (2022.05); *H04W 74/0816* (2013.01); *H04W 76/12* (2018.02)

(58) Field of Classification Search
CPC ......... H04W 56/0015; H04W 74/0816; H04W 76/12; H04W 4/80; H04W 12/02;
(Continued)

(56) References Cited

U.S. PATENT DOCUMENTS 11,038,937 B1 6/2021 D'Amato
2019/0387382 A1* 12/2019 Wojcieszak ............ H04W 4/80
(Continued)

FOREIGN PATENT DOCUMENTS

CN 104380682 A 2/2015

OTHER PUBLICATIONS

International Search Report and Written Opinion—PCT/US2022/020962—ISA/EPO—Oct. 12, 2022 (2200159WO).
Taiwan Search Report—TW112102929—TIPO—Feb. 23, 2026 (2200159TW).

*Primary Examiner* — Brian T Le
(74) *Attorney, Agent, or Firm* — Holland & Hart LLP

(57) ABSTRACT

This disclosure provides methods, devices, and systems for streaming media from a Bluetooth-enabled peripheral device to a WLAN device over a wireless link (such as a P2P link). In some instances, a first peripheral device of a pair of peripheral devices selects values of a time-to-play (TTP) and a sequence number of a first audio stream, and synchronizes the selected TTP and sequence number with a TTP and a sequence number of a second audio stream. The first peripheral device rate-converts first audio data using a sample rate conversion ratio based on the selected TTP and sequence number, encapsulates the rate-converted first audio data into first RTP packets, and transmits the first RTP packets to the WLAN device concurrently with a transmission of second
(Continued)

RTP packets from the second peripheral device to the WLAN device.

30 Claims, 13 Drawing Sheets

(51) Int. Cl.
*H04W 74/0816* (2024.01)
*H04W 76/12* (2018.01)

(58) Field of Classification Search
CPC ....... H04L 65/65; H04L 65/70; H04L 65/762; H04L 65/4015; H04L 63/00
See application file for complete search history.

(56) References Cited

U.S. PATENT DOCUMENTS

2021/0058517 A1* 2/2021 Serbajlo .............. H04L 12/1827
2022/0078219 A1* 3/2022 D'Amato .............. H04L 65/611

* cited by examiner

400A

400B

500B 520
540
510
512

WIRELESS MICROPHONE SYNCHRONIZATION FOR BTOIP TWS EARBUDS

CROSS-REFERENCE TO RELATED APPLICATIONS

The present Application is a 371 national stage filing of International PCT Application No. PCT/US2022/020962 by CAMPBELL et al. entitled "WIRELESS MICROPHONE SYNCHRONIZATION FOR BTOIP TWS EARBUDS," filed Mar. 18, 2022; and claims priority to Indian Patent Application No. 202241004351 by CAMPBELL et al. entitled "WIRELESS MICROPHONE SYNCHRONIZATION FOR BTOIP TWS EARBUDS," filed Jan. 26, 2022, each of which is assigned to the assignee hereof, and each of which is expressly incorporated by reference in its entirety herein.

TECHNICAL FIELD

This disclosure relates generally to wireless communications, and more specifically, to transmitting data to a Bluetooth-enabled device over a Wi-Fi channel.

DESCRIPTION OF THE RELATED TECHNOLOGY

A wireless personal area network (WPAN) is a short-range wireless network typically established by a user to interconnect various personal devices, sensors, and/or appliances located within a certain distance or area of the user. For example, WPANs based on communication protocols such as a Bluetooth® (BT) protocol, a Bluetooth® Low Energy protocol, or a Zigbee® protocol may provide wireless connectivity to peripheral devices within a specific distance (e.g., 5 meters, 10 meter, 20 meters, 100 meters, etc.) of the user.

Bluetooth is a short-range wireless communication protocol that supports a WPAN between a central device (such as a host device) and at least one peripheral device (such as a client device). Power consumption associated with Bluetooth communications may render Bluetooth impractical in certain applications.

To address the power consumption issue associated with Bluetooth, Bluetooth® Low Energy (BLE) was developed and adopted in various applications in which data transfers are relatively infrequent. Specifically, BLE exploits the infrequent transfer of data by using a low duty cycle operation, and placing one or both the central device and the peripheral device(s) into a sleep mode between data transmissions, thereby conserving power. Example applications that use BLE include battery-operated sensors and actuators in various medical, industrial, consumer, and fitness applications. BLE may also be used to connect devices such as BLE enabled smart phones, tablets, and laptops. While traditional Bluetooth and BLE offer certain advantages, there exists a need for further improvements in Bluetooth and BLE technology. For example, traditional Bluetooth and BLE have limited range, have limited data capacity throughput, and are susceptible to interference from other devices communicating in the same frequency band (e.g., Wi-Fi communications).

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

One innovative aspect of the subject matter described in this disclosure can be implemented as a method of wireless communication by a first peripheral device of a pair of peripheral devices. In some implementations, the method includes receiving a message from a wireless device, the message instructing the pair of peripheral devices to begin streaming media to the wireless device over a wireless link. The streaming media may include a first audio stream associated with the first peripheral device and a second audio stream associated with a second peripheral device of the pair of peripheral devices. The method includes selecting values of a time-to-play (TTP) and a sequence number associated with the first audio stream, and synchronizing the selected values of the TTP and the sequence number associated with the first audio stream with a TTP and a sequence number associated with the second audio stream. The method includes converting the sample rate of audio data associated with the first audio stream using a sample rate conversion ratio based on the selected values of the TTP and the sequence number. The method includes encapsulating the rate-converted audio data into a plurality of first Real-time Transport Protocol (RTP) packets based at least in part on the selected values of the TTP and the sequence number. The method includes transmitting the plurality of first RTP packets over the wireless link to the wireless device concurrently with a transmission of a plurality of second RTP packets over the wireless link from the second peripheral device to the wireless device.

In various implementations, the wireless link may be at least one of a peer-to-peer (P2P) link, a tunneled direct-link setup (TDLS) link, a Wi-Fi Direct link, a link associated with a Group Owner (GO), or a link associated with a Neighborhood Area Network (NAN). In some instances, the wireless link may be a wireless channel in a sub-GHz frequency band, a 2.4 GHz frequency band, a 5 GHz frequency band, a 6 GHz frequency band, or a 60 GHz frequency band. In some other instances, the wireless link may occupy one or more portions of another frequency band.

In some implementations, the first RTP packets correspond to the first audio stream and carry audio data sampled by a microphone of the first peripheral device, and the second RTP packets correspond to the second audio stream and carry audio data sampled by a microphone of the second peripheral device. In some instances, the audio data carried in the first RTP packets is rate-matched with the audio data carried in the second RTP packets based on the synchronized TTPs and sequence numbers.

In other implementations, synchronizing the selected values of the TTP and the sequence number includes sending a message to the second peripheral device over an Asynchronous Connection-Less (ACL) link between the first and second peripheral devices, the message configured to initialize a timing state or a clock state of the second peripheral device. In some aspects, the message may be configured to adjust a sample rate conversion ratio used by the second peripheral device for rate-converting audio data associated with the second audio stream. In other aspects, the method may include disabling the ACL link after sending the message to the second peripheral device.

In some instances, the method may include adjusting the selected values of the TTP and the sequence number associated with the first audio stream based on at least one of a Bluetooth piconet clock shared by the first and second peripheral devices, a timing and synchronization function (TSF) of the wireless device, or a TSF of a wireless access point (AP) with which the wireless device is associated. In other instances, the method may include obtaining a value of a Bluetooth wall-clock on board the first peripheral device, and adjusting the selected values of the TTP and the sequence number based on the obtained value of the Bluetooth wall-clock.

In various aspects, each of the plurality of first RTP packets includes an RTP header indicating the TTP associated with the respective RTP packet, the sequence number associated with the respective RTP packet, and a synchronization source (SSRC) identifier corresponding to the first peripheral device. In some aspects, the sequence numbers and the SSRC identifiers carried in the streaming audio collectively indicate that audio data carried in the first audio stream is rate matched and temporally aligned with audio data carried in the second audio stream.

Another innovative aspect of the subject matter described in this disclosure can be implemented in a first peripheral device of a pair of peripheral devices. In some implementations, the first peripheral device includes one or more wireless radios, one or more processors coupled to the one or more wireless radios, and a memory coupled to the one or more processors. In some instances, the memory stores instructions that, when executed by the one or more processors in conjunction with the one or more wireless radios, is configured receive a message from a wireless device, the message instructing the pair of peripheral devices to begin streaming media to the wireless device over a wireless link. The streaming media may include a first audio stream associated with the first peripheral device and a second audio stream associated with a second peripheral device of the pair of peripheral devices. Execution of the instructions may be configured to select values of a TTP and a sequence number associated with the first audio stream, and to synchronize the selected values of the TTP and the sequence number associated with the first audio stream with a TTP and a sequence number associated with the second audio stream. Execution of the instructions may be configured to convert the sample rate of audio data associated with the first audio stream using a sample rate conversion ratio based on the selected values of the TTP and the sequence number. Execution of the instructions may be configured to encapsulate the rate-converted audio data into a plurality of first RTP packets based at least in part on the selected values of the TTP and the sequence number. Execution of the instructions may be configured to transmit the plurality of first RTP packets over the wireless link to the wireless device concurrently with a transmission of a plurality of second RTP packets over the wireless link from the second peripheral device to the wireless device.

In various implementations, the wireless link may be at least one of a P2P link, a TDLS link, a Wi-Fi Direct link, a link associated with a Group Owner (GO), or a link associated with a Neighborhood Area Network (NAN). In some instances, the wireless link may be a wireless channel in a sub-GHz frequency band, a 2.4 GHz frequency band, a 5 GHz frequency band, a 6 GHz frequency band, or a 60 GHz frequency band. In some other instances, the wireless link may occupy one or more portions of another frequency band.

In some implementations, the first RTP packets correspond to the first audio stream and carry audio data sampled by a microphone of the first peripheral device, and the second RTP packets correspond to the second audio stream and carry audio data sampled by a microphone of the second peripheral device. In some instances, the audio data carried in the first RTP packets is rate-matched with the audio data carried in the second RTP packets based on the synchronized TTPs and sequence numbers.

In other implementations, synchronizing the selected values of the TTP and the sequence number includes sending a message to the second peripheral device over an ACL link between the first and second peripheral devices, the message configured to initialize a timing state or a clock state of the second peripheral device. In some aspects, the message may be configured to adjust a sample rate conversion ratio used by the second peripheral device for rate-converting audio data associated with the second audio stream. In other aspects, execution of the instructions is further configured to disable the ACL link after sending the message to the second peripheral device.

In some instances, execution of the instructions may be further configured to adjust the selected values of the TTP and the sequence number associated with the first audio stream based on at least one of a Bluetooth piconet clock shared by the first and second peripheral devices, a TSF of the wireless device, or a TSF of a wireless AP with which the wireless device is associated. In other instances, execution of the instructions may be further configured to obtain a value of a Bluetooth wall-clock on board the first peripheral device, and to adjust the selected values of the TTP and the sequence number based on the obtained value of the Bluetooth wall-clock.

In various aspects, each of the plurality of first RTP packets includes an RTP header indicating the TTP associated with the respective RTP packet, the sequence number associated with the respective RTP packet, and an SSRC identifier corresponding to the first peripheral device. In some aspects, the sequence numbers and the SSRC identifiers carried in the streaming audio collectively indicate that audio data carried in the first audio stream is rate matched and temporally aligned with audio data carried in the second audio stream.

Details of one or more implementations of the subject matter described in this disclosure are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
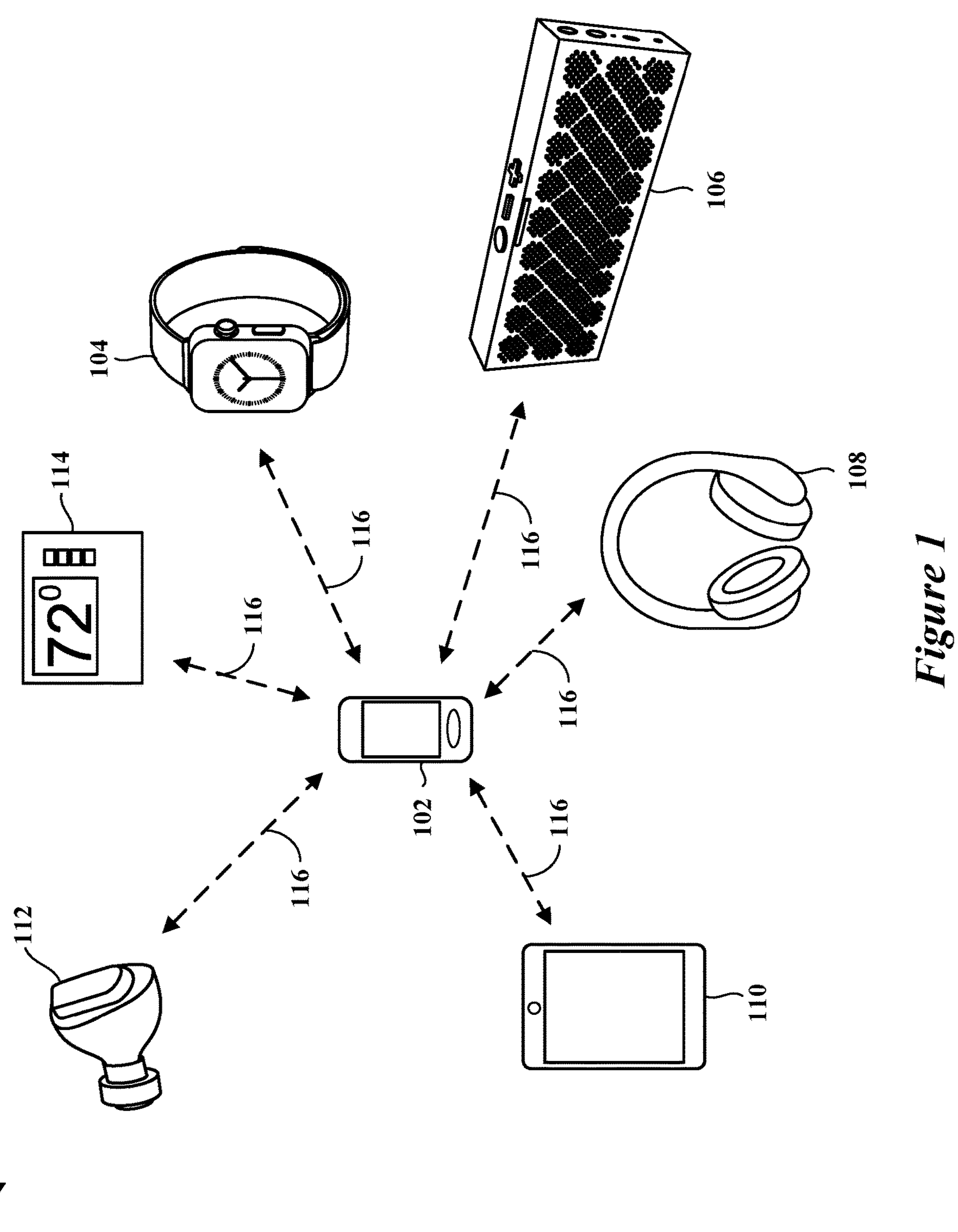
FIG. 1 shows a pictorial diagram of an example Wireless Personal Area Network (WPAN), according to various aspects of the present disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can include a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

Communications based on traditional Bluetooth and BLE suffer from several limitations that can limit user experiences and negatively affect user experiences. For example, the range of traditional Bluetooth and BLE is limited by a single hop radio frequency (RF) transmission. Additionally, traditional Bluetooth and BLE have limited data capacity, which can have several negative effects on user experience. For example, the limited data capacity of traditional Bluetooth and BLE can result in limited audio quality or a quality level unacceptable to the user. Further, traditional Bluetooth and BLE are enabled for radio frequency communication operating within the globally accepted 2.4 GHz Industrial, Scientific & Medical (ISM) frequency band. However, Bluetooth and BLE devices that operate only within the 2.4 GHz frequency band may be subject to interference from other devices communicating with each other in the 2.4 GHz frequency band (such as Wi-Fi devices).

To address these limitations, Bluetooth and BLE devices may be configured in accordance with various aspects of the subject matter disclosed herein to operate using a Bluetooth (BT) over Internet Protocol (BToIP) that allows Bluetooth and BLE data to be communicated over wireless networks that are based on, or that are at least compatible with, IP packets. For example, Bluetooth and BLE devices configured in accordance with the present disclosure can transmit and receive Bluetooth/BLE data over one or more channels associated with a wireless local area network (WLAN) by encapsulating Bluetooth/BLE data within packets formatted according to the IEEE 802.11 family of wireless communication standards. In this way, Bluetooth and BLE devices can communicate with one another in not only the 2.4 GHz frequency band, but also in the 5 GHz, the 6 GHz frequency band, and other suitable frequency bands.

In some other implementations, Bluetooth and BLE devices may be configured in accordance with various aspects of the subject matter disclosed herein to operate using a Bluetooth (BT) over WLAN (BToWLAN) protocol that allows WLAN-compliant data packets (such as IEEE 802.11-compliant PPDUs) to include encapsulated Ethernet frames carrying encoded Bluetooth data intended for one or more associated Bluetooth peripheral devices. The Ethernet frames may be of a new Ethertype indicating that the Ethernet frames carry Bluetooth-encoded data intended for one or more Bluetooth peripheral devices. The new Ethertype may also signal that the Ethernet frames are non IP-based Ethernet frames that do not need to pass through a TCP/IP stack prior to transmission to the one or more Bluetooth peripheral devices, thereby avoiding latencies associated with the TCP/IP stack.

True Wireless (TWS) earbuds are Bluetooth-enabled peripheral devices that allow each of the right and left earbuds to sample or record audio from a corresponding microphone and transmit the resulting audio samples to another wireless device (such as a WLAN device that operates or implements a software enabled access point (softAP)). The wireless device can combine the audio samples received from each of the earbuds to generate a stereo audio stream that, in turn, can be transmitted to a remote device or server through a wireless access point (AP). For example, a stereo audio stream generated by the wireless device may be transmitted to an online gaming server, or transmitted alongside a video recording to a video blog.

When the earbuds are paired with a central device via a Bluetooth connection, the right and left earbuds have separate Connected Isochronous Stream (CIS) connections to the central device that allow the earbuds to transmit their respective audio samples to the central device using Bluetooth Low Energy (LE) audio. The CIS connections associated with the right and left earbuds may be members of a Connected Isochronous Group (CIG) that allows the right and left earbuds to rate match and temporally align their respective audio samples with each other before transmission to the central device. As a result, the central device may be able to combine the right and left audio samples received from the right and left earbuds over the respective CIS connections to generate a stereo audio stream without performing additional rate matching or temporal alignment of the received audio samples.

However, when the right and left audio samples recorded by the earbuds are transmitted over a Wi-Fi channel or link to a wireless device based on a BToIP protocol, the CIG is not available to rate match and temporally align the right and left audio samples with each other prior to or during transmission to the wireless device. As a result, the wireless device may not be able to properly combine the right and left audio samples to generate a stereo audio stream without additional rate-matching and frame alignment processing. As such, there is a need to rate match and temporally align audio samples recorded by right and left earbuds with each other prior to transmission of corresponding right and left audio streams to a wireless device over a Wi-Fi channel or link based on the BToIP protocol described herein.

In accordance with various aspects of the present disclosure, a pair of peripheral devices (such as a pair of TWS earbuds) transmits first and second audio streams carrying first and second audio samples, respectively, to a wireless device over the wireless link in a manner which ensures that the first and second audio samples are rate matched and temporally aligned with each other. In some implementations, a first peripheral device (such as a first earbud) includes a first microphone that records the first audio samples, and a second peripheral device (such as a second earbud) includes a second microphone that records the second audio samples. The first peripheral device selects values of a time-to-play (TTP) and a sequence number associated with the first audio stream, and synchronizes the selected values of the TTP and the sequence number associated with the first audio stream with a TTP and a sequence number associated with the second audio stream. The first peripheral device converts the sample rate of audio data associated with the first audio stream using a sample rate conversion ratio based on the selected values of the TTP and the sequence number, and encapsulates the rate-converted audio data into a plurality of first Real-time Transport Protocol (RTP) packets based on the selected values of the TTP and the sequence number.

Similarly, the second peripheral device converts the sample rate of audio data associated with the second audio stream using a sample rate conversion ratio based on the synchronized values of the TTP and the sequence number, and encapsulates the rate-converted audio data into a plurality of second RTP packets based on the synchronized values of the TTP and the sequence number. The first peripheral device transmits the plurality of first RTP packets over the wireless link to the wireless device concurrently with a transmission of the plurality of second RTP packets over the wireless link from the second peripheral device to the wireless device.

By synchronizing the sample rate conversion ratio used by the first peripheral device with the sample rate conversion ratio used by the second peripheral device, aspects of the subject matter disclosed herein may ensure that the first audio samples carried in the first audio stream are rate matched and temporally aligned with the second audio samples carried in the second audio stream. In this way, the wireless device may combine the first and second audio streams into a stereo audio stream without additional rate matching or temporal alignment of the first and second audio streams, thereby simplifying the design of the wireless device and allowing aspects of the present disclosure to be implemented in legacy devices.

FIG. 1 shows a pictorial diagram of an example Wireless Personal Area Network (WPAN) 100, according to some implementations. Within the WPAN 100, a central device 102 may connect to and establish a BLE communication link 116 with one or more peripheral devices 104, 106, 108, 110, 112, and 114 using a BLE protocol or a modified BLE protocol. The BLE protocol is part of the BT core specification and enables radio frequency communication operating within the globally accepted 2.4 GHz Industrial, Scientific & Medical (ISM) band.

The central device 102 may include suitable logic, circuitry, interfaces, processors, and/or code that may be used to communicate with one or more of the peripheral devices 104, 106, 108, 110, 112, or 114 using the BLE protocol or the BToIP protocol as described herein. The central device 102 may operate as an initiator to request establishment of a link layer (LL) connection with an intended peripheral device 104, 106, 108, 110, 112, or 114. A Link Manager may be used to control operations between a BToIP application controller in the central device 102 and a BToIP application controller in each of the intended peripheral devices 104, 106, 108, 110, 112, and/or 114.

After a requested link layer connection is established, the central device 102 may become a host device, and the selected or intended peripheral device 104, 106, 108, 110, 112, or 114 may become paired with the central device 102 over the established link layer connection. As a host device, the central device 102 may be capable of supporting multiple link layer connections at a time with various peripheral devices 104, 106, 108, 110, 112, or 114 operating as client devices. Specifically, the central device 102 may manage various aspects of data packet communication in a link layer connection with one or more of the associated peripheral devices 104, 106, 108, 110, 112, or 114. For example, the central device 102 may determine an operation schedule in the link layer connection with one or more peripheral devices 104, 106, 108, 110, 112, or 114. The central device 102 may also initiate a link layer protocol data unit (PDU) exchange sequence over the link layer connection. Link layer connections may be configured to run periodic connection events in dedicated data channels. The exchange of link layer data transmissions between the central device 102 and one or more of the peripheral devices 104, 106, 108, 110, 112, or 114 may take place within connection events.

In some implementations, the central device 102 may be configured to transmit the first link layer data unit in each connection event to an intended peripheral device 104, 106, 108, 110, 112, or 114. In other implementations, the central device 102 may utilize a polling scheme to poll the intended peripheral device 104, 106, 108, 110, 112, or 114 for a link layer data transmission during a connection event. The intended peripheral device 104, 106, 108, 110, 112, or 114 may transmit a link layer data unit upon receipt of packet link layer data PDU from the central device 102. In some other implementations, a peripheral device 104, 106, 108, 110, 112, or 114 may transmit a link layer data unit to the central device 102 without first receiving a link layer data unit from the central device 102.

Examples of the central device 102 may include a cellular phone, a smart phone, a session initiation protocol (SIP) phone, a mobile station (STA), a laptop, a personal computer (PC), a desktop computer, a personal digital assistant (PDA), a satellite radio, a global positioning system, a multimedia device, a video device, a digital audio player, a camera, a game console, a tablet, a smart device, a wearable device (such as a smart watch, wireless headphones, etc.), a vehicle, an electric meter, a gas pump, a toaster, a thermostat, a hearing aid, a blood glucose on-body unit, an Internet-of-Things (IoT) device, or any other similarly functioning device.

Examples of the one or more peripheral devices 104, 106, 108, 110, 112, or 114 may include a cellular phone, a smart phone, a SIP phone, a STA, a laptop, a PC, a desktop computer, a PDA, a satellite radio, a global positioning system, a multimedia device, a video device, a digital audio player, a camera, a game console, a tablet, a smart device, a wearable device (such as a smart watch, wireless headphones, wireless earbuds, AR/VR headsets, etc.), a vehicle, an electric meter, a gas pump, a toaster, a thermostat, a hearing aid, a blood glucose on-body unit, an IoT device, or any other similarly functioning device. Although the central device 102 is illustrated in communication with six peripheral devices 104, 106, 108, 110, 112, or 114 in the WPAN 100, the central device 102 may communicate with more or fewer than six peripheral devices within the WPAN 100 without departing from the scope of the present disclosure.

A device implementing the BT protocol, such as the central device 102, may operate according to one radio mode, such as basic rate (BR)/enhanced data rate (EDR), and a device implementing the BLE protocol may operation according to a BLE radio mode. In some aspects, the central device 102 may be configured with dual radio modes, and therefore may be able to operate according to the BR/EDR mode or the BLE mode, for example, based on the type of short-rage wireless communication in which the device may engage.

For example, the central device 102 may operate according to the BR/EDR mode for continuous streaming of data, for broadcast networks, for mesh networks, and/or for some other applications in which a relatively higher data ratemay be more suitable. However, the device may operate according to the BLE mode for short burst data transmissions, such as for some other applications in which power conservation may be desirable and/or a relatively lower data rate may be acceptable. In other aspects, the central device 102 may operate according to one or more other radio modes, including proprietary radio mode(s). Examples of other radio modes may include high speedradio modes, low energy radio modes, isochronous radio modes, etc.

Figure 2:
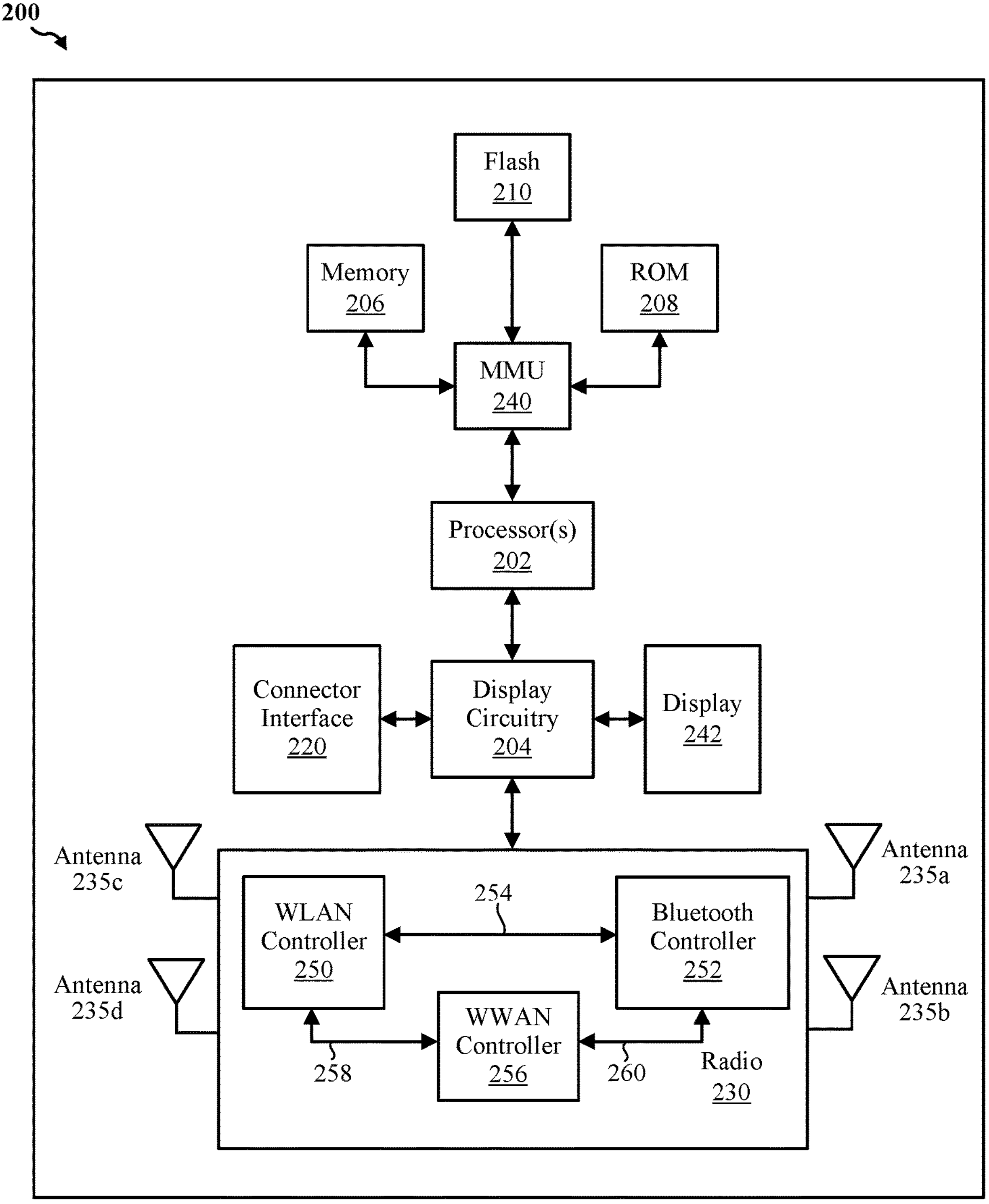
FIG. 2 shows a block diagram of a wireless device, according to various aspects of the present disclosure.

FIG. 2 shows a block diagram of a wireless device 200, according to some implementations. In some instances, the wireless device 200 may be an example of the central device 102 of FIG. 1. In other instances, the wireless device 200 may be an example of one or more of the peripheral devices 104, 106, 108, 110, 112, or 114 of FIG. 1. In some aspects, the wireless device 200 may be a Bluetooth-enabled device (such as a BLE device).

As shown, the wireless device 200 may include a processing element, such as processor(s) 202, which may execute program instructions for the wireless device 200. The wireless device 200 may also include display circuitry 204 that can perform graphics processing and present information to a user via the display 242. The processor(s) 202 may also be coupled to memory management unit (MMU) 240, which may be configured to receive addresses from the processor(s) 202 and translate the addresses to address locations in memory such as memory 206, ROM 208, or Flash memory 210) and/or to address locations in other circuits or devices, such as the display circuitry 204, radio 230, connector interface 220, and/or display 242. The MMU 240 may also be configured to perform memory protection and page table translation or set up. In some aspects, the MMU 240 may be included as a portion of the processor(s) 202.

The processor(s) 202 may be coupled to other circuits of the wireless device 200. For example, the wireless device 200 may include various types of memory, a connector interface 220 through which the wireless device 200 can communicate with the computer system, and wireless communication subsystems that can transmit data to, and receive data from, other devices based on one or more wireless communication standards or protocols. For example, in some aspects, the wireless communication subsystems may include (but are not limited to) a WLAN subsystem, a Bluetooth subsystem, or a cellular subsystem (such as an LTE or 5G NR subsystem). The wireless device 200 may include a plurality of antennas 235*a*, 235*b*, 235*c*, or 235*d* for performing wireless communication with, for example, wireless devices in a WPAN.

The wireless device 200 may be configured to implement part or all of the techniques described herein by executing program instructions stored on a memory medium (such as a non-transitory computer-readable memory medium) and/or through hardware or firmware operation. In other embodiments, the techniques described herein may be at least partially implemented by a programmable hardware element, such as an field programmable gate array (FPGA), and/or an application specific integrated circuit (ASIC).

In certain aspects, the radio 230 may include separate controllers configured to control communications for various respective radio access technology (RAT) protocols. For example, as shown in FIG. 2, radio 230 may include a WLAN controller 250 that manages WLAN communications, a Bluetooth controller 252 that manages Bluetooth and BLE, and a WWAN controller 256 that manages WWAN communications. In certain aspects, the wireless device 200 may store and execute a WLAN software driver for controlling WLAN operations performed by the WLAN controller 250, a Bluetooth software driver for controlling Bluetooth operations performed by the Bluetooth controller 252, and/or a WWAN software driver for controlling WWAN operations performed by the WWAN controller 256.

In certain implementations, a first coexistence interface 254 (such as a wired interface) may be used for sending information between the WLAN controller 250 and the Bluetooth controller 252. In certain other implementations, a second coexistence interface 258 may be used for sending information between the WLAN controller 250 and the WWAN controller 256. In certain other implementations, a third coexistence interface 260 may be used for sending information between the Bluetooth controller 252 and the WWAN controller 256.

In some aspects, one or more of the WLAN controller 250, the Bluetooth controller 252, and/or the WWAN controller 256 may be implemented as hardware, software, firmware or some combination thereof.

In certain configurations, the WLAN controller 250 may be configured to communicate with a second device in a WPAN using a WLAN link using all of the antennas 235*a*, 235*b*, 235*c*, and 235*d*. In certain other configurations, the Bluetooth controller 252 may be configured to communicate with at least one second device in a WPAN using one or more of the antennas 235*a*, 235*b*, 235*c*, and 235*d*. In certain other configurations, the WWAN controller 256 may be configured to communicate with a second device in a WPAN using all of the antennas 235*a*, 235*b*, 235*c*, and 235*d*. The WLAN controller 250, the Bluetooth controller 252, and/or the WWAN controller 256 may be configured to adjust wakeup time interval and shutdown time for the device.

Figure 3:
FIG. 3 shows a block diagram of a Bluetooth over Internet Protocol (BToIP) protocol stack, according to various aspects of the present disclosure.
Figure 3:
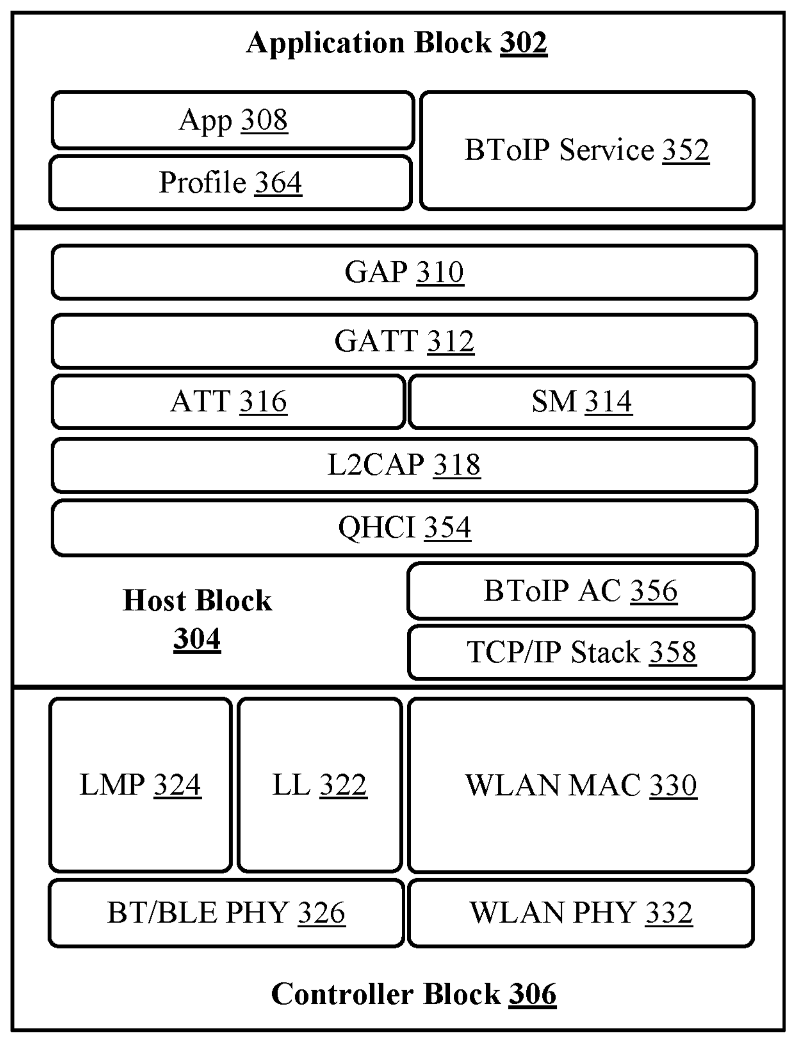

FIG. 3 shows a block diagram of a BToIP protocol stack 300, according to some implementations. The BToIP protocol stack 300 may be implemented by one or more of processor(s) 202, memory 206, Flash memory 210, ROM 208, the radio 230, and/or the Bluetooth controller 252 described with reference to FIG. 2. In some implementations, the BToIP protocol stack 300 may be organized into three blocks, namely, the Application block 302, the Host block 304, and the Controller block 306. The Application block 302 may be a user application that interfaces with the other blocks and/or layers of the BToIP protocol stack 300. In some aspects, the Application block 302 may include one or more applications and one or more Bluetooth profiles that allow the applications to use the Bluetooth (BT) and BLE communications. The Host block 304 may include the upper layers of the BToIP protocol stack 300, and the Controller block 306 may include the lower layers of the BToIP protocol stack 300. The Host block 304 may communicate with a controller (such as the Bluetooth controller 252 of FIG. 2) in a wireless device using a Host Controller Interface (HCI) such as QHCI 354. The QHCI 354 may also be used as an interface between the Controller block 306 and the Host block 304 that allows a wide range of Hosts to interface with the Controller block 306. In some aspects, the Controller block 306 may be used for hardware interface management, link establishment, and link management.

The Application block 302 may include a higher-level Application Layer (App) 308, a Profile Layer (Profile) 364, and a BToIP Service layer 352. The Host block 304 may include a Generic Access Profile (GAP) 310, a Generic Attribute Protocol (GATT) 312, a Security Manager (SM) 314, an Attribute Protocol (ATT) 316, a Logical Link Control and Adaptation Protocol (L2CAP) 318, and the QHCI 354. In some aspects, the Host block 304 may also include a BToIP Application Controller (BToIP AC) 356 and a TCP/IP stack 358. The Controller block 306 may include a Link Layer (LL) 322, a Link Manager Protocol (LMP) 324, a BT/BLE Physical Layer (PHY) 326, a WLAN MAC 330, and a WLAN Physical Layer (WLAN PHY) 332.

To support IoT applications, audio applications, and other applications, the BT/BLE PHY 326 may be configured to support wider communication bandwidths and data rate than PHYs associated with conventional Bluetooth or BLE protocol stacks. For example, in some aspects, the BT/BLE PHY 326 may define the mechanism for transmitting a bit stream over a physical link that connects BLE devices. The bit stream may be grouped into code words or symbols, and converted to a PDU that is transmitted over a wireless medium. The BT/BLE PHY 326 may provide an electrical, mechanical, and procedural interface for the wireless medium. Specifically, the BT/BLE PHY 326 may specify the frequency band, the channel bandwidth, the modulation and coding scheme (MCS), the cyclic-shift diversity (CSD), and other physical aspects of wireless transmissions. The WLAN PHY 332 may define the mechanism for transmitting a bit stream over a physical WLAN link that connects two or more devices (such as WLAN devices). The BT/BLE PHY 326 and the WLAN PHY 330 may provide an electrical, mechanical, and procedural interface to the transmission medium. The shapes and properties of the electrical connectors, the frequency band used for transmission, the modulation scheme, and similar low-level parameters may be specified by the BT/BLE PHY 326 and WLAN PHY 330.

The LMP 324 may be responsible for low level communication over the BT/BLE PHY 326. The LMP 324 may manage the sequence and timing of transmitted and received link layer data PDUs, and using a link layer protocol, communicate with other devices regarding connection parameters and data flow control. In some aspects, the LMP 324 may provide gate keeping functionality to limit exposure and data exchange with other devices. In some implementations, the LMP 324 may maintain a list of allowed devices and ignore all requests for baseband PDU exchange from devices not on the list. The LMP 324 may use the QHCI 354 to communicate with upper layers of the BToIP protocol stack 300. In certain aspects, the LMP 324 may be used to generate a baseband PDU and/or an empty packet (such as an empty PDU) that may be transmitted using a LMP communication link established with another traditional BT device (such as a BR/EDR device) using the LMP 324.

The LL 322 may be responsible for low level communication over the BT/BLE PHY 326. The LL 322 may manage the sequence and timing of transmitted and received LL data PDUs, and using a LL protocol, communicate with other devices regarding connection parameters and data flow control. The LL 322 may provide gate keeping functionality to limit exposure and data exchange with other devices. If filtering is configured, the LL 322 may maintain a list of allowed devices and ignore all requests for data PDU exchange from devices not on the list. The LL 322 may use the QHCI 354 to communicate with upper layers of the BToIP protocol stack 300. In certain aspects, the LL 322 may be used to generate a LL data PDU and/or an empty packet (such as an empty PDU) that may be transmitted using a LL communication link established with another BLE device using the LL 322

The L2CAP 318 provides connection oriented and connectionless data services to upper layer protocols with protocol multiplexing capability and segmentation and reassembly operation. The L2CAP 318 permits higher level protocols and applications to transmit and receive upper layer data packets (L2CAP Service Data Units, SDU) up to 64 kilobytes in length. L2CAP also permits per-channel flow control and retransmission.

The ATT 316 may be a client/server protocol based on attributes associated with a BLE device configured for a particular purpose (such as monitoring heart rate, monitoring temperature, broadcasting advertisements, etc.). The attributes may be discovered, read, and written by other BLE enabled devices. The set of operations which are executed over ATT 316 may include, but are not limited to, error handling, server configuration, find information, read operations, write operations, queued writes, etc. The ATT 316 may form the basis of data exchange between BLE devices.

The SM 314 may be responsible for device pairing and key distribution. A security manager protocol implemented by the SM 314 may define how communications with the SM of a counterpart BLE deice are performed. The SM 314 may provide additional cryptographic functions that may be used by other components of the modified BLE protocol stack 300. The architecture of the SM 314 used in BLE may be designed to minimize recourse requirements for peripheral devices by shifting work to a central device. The SM 314 provides a mechanism to not only encrypt the data but also to provide data authentication.

The GATT 312 describes a service framework using the attribute protocol for discovering services, and for reading and writing characteristic values on a counterpart BLE device. The GATT 312 interfaces with the App 308 through the App's profile. The App 308 profile defines the collection of attributes and any permission associated with the attributes to be used in BLE communications. One of the benefits of BT technology is device interoperability. To assure interoperability, using a standardized wireless protocol to transfer bytes of information may be inadequate, and hence, sharing data representation levels may be needed. In other words, BLE devices may send or receive data in the same format using the same data interpretation based on intended device functionality. The attribute profile used by the GATT 312 may act as a bridge between the modified BLE protocol stack and the application and functionality of the BLE device (at least from a wireless connection point of view), and is defined by the profile.

The GAP 310 may provide an interface for the App 308 to initiate, establish, and manage connection with counterpart BT/BLE devices. The profile layer 364 may include a set of BT/BLE profiles including, but not limited to, an advanced audio distribution profile (A2DP), an audio/video remote control profile (AVRCP), a hands-free profile (HFP), and the like. The profiles of the profile layer 364 may operate over the L2CAP 318. The BToIP Service 352 may determine whether a peripheral device (such as one of the peripheral devices 104, 106, 108, 110, 112, or 114 of FIG. 1) supports BToIP protocol and/or is enabled to communicate via BToIP protocol. The BToIP Service 352 may be configured to exchange features (such as control point notifications) with the second device based on some triggers, events, and/or conditions detected or determined by the first device (such as via processor 202 of the first device). The exchanged features (such as the control point notifications) may indicate to the second device one or more actions the second device may perform.

The QHCI 354 may determine whether a Bluetooth packet is to be transmitted using a traditional Bluetooth protocol or using the BToIP protocol disclosed herein. The BToIP protocol bearer may be a software enabled access point (softAP) or an access point (AP). A BToIP protocol bearer may operate over multiple globally accepted ISM bands including, but not limited to, the 2.4 GHz ISM band, the 5 GHz ISM band, the 6 GHz ISM band, and the like. In some implementations, a WLAN radio of the device and/or the App layer 308 of the device may be configured to select one of the globally accepted ISM band over which the BToIP protocol bearer operates.

If the QHCI 354 determines that the Bluetooth packet and/or payload is to be transmitted via the BToIP protocol, then the QHCI 354 may route the Bluetooth packet and/or payload to the BToIP AC 356. In some aspects, the QHCI 354 may indicate to the BToIP AC 356 that the Bluetooth packet and/or payload is to be transmitted using the BToIP protocol.

The BToIP AC 356 may be configured to encapsulate data packets in a manner indicating that the data packets are to be transmitted over a WLAN channel or link using the BToIP protocol. For example, the BToIP AC 356 may add, to each data packet that is to be transmitted using the BToIP protocol, a header indicating that the respective data packet is formatted for transmission based on the BToIP protocol. The BToIP AC 356 may also be configured to decapsulate data packets received using the BToIP protocol, and forward the decapsulated data to other layers of the BToIP protocol stack 300. In some aspects, the BToIP AC 356 may decapsulate received BToIP packets by stripping the BToIP headers from the received BToIP packets and forwarding the decapsulated data to the other layers of the BToIP protocol stack 300.

The TCP/IP stack 358 may encapsulate BToIP packets with TCP/IP or TCP/UDP headers and forward the encapsulated BToIP packets to the WLAN MAC 330. The TCP/IP stack 358 may decapsulate packets received via the BToIP link and forward the decapsulated data to the other layers of the BToIP protocol stack 300. The WLAN PHY 332 may transmit BToIP packets to, and receive BToIP packets from, a peripheral device over a WLAN channel or link. In some aspects, the WLAN MAC 330 may be responsible for low level communication over the WLAN PHY 332.

Figure 4A:
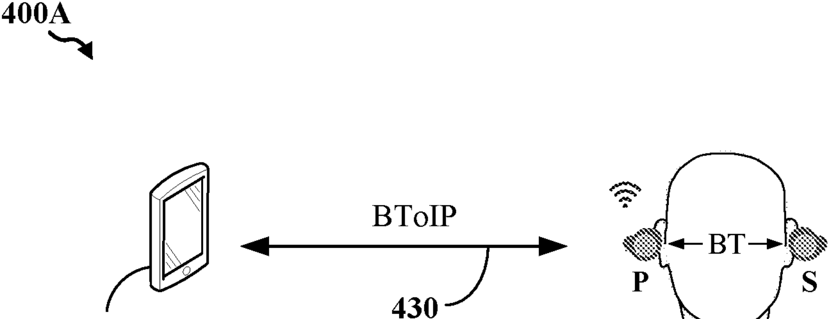
FIGS. 4A-4B show example topologies of a wireless network that supports wireless communications using the BToIP protocol disclosed herein.
Figure 4B:
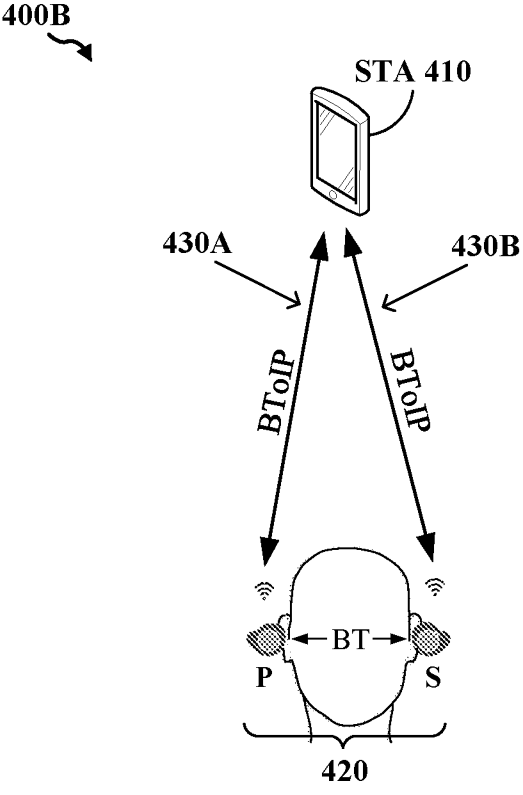

FIGS. 4A-4B show example topologies of wireless networks that support wireless communications using the BToIP disclosed herein. For example, FIG. 4A shows an example wireless network 400A that includes a STA 410 and a pair of earbuds 420 that may be paired with each other via a Bluetooth connection. In some implementations, the STA 410 may be one example of the central device 102 of FIG. 1, and the peripheral device 420 may be one example of the peripheral device 112 of FIG. 1. In various aspects, the STA 410 and earbuds 420 are also connected by a communication link 430 over which the STA 410 and the earbuds 420 may exchange data and other information with each other based on the BToIP disclosed herein. As discussed, the BToIP allows the STA 410 to transmit Bluetooth-encoded data (such as an audio stream or a video stream) to the earbuds 420 over the communication link 430 using frames or packets compliant with the IEEE 802.11 family of wireless communication standards.

The communication link 430 may be any suitable contention-based communication link that allows the STA 410 and the peripheral device 420 to communicate with each other using WLAN-compliant data packets. In some aspects, the communication link 430 may be a Wi-Fi link such as (but not limited to) a P2P link, a TDLS link, or a Wi-Fi Direct link. In some instances, the STA 410 may implement a softAP that operates on the same wireless channels as the STA 410, and the earbuds 420 may be associated with the softAP. In this way, the earbuds 420 may be associated with the softAP, which may allow the STA 410 to communicate directly with the earbuds 420 over the communication link 430 without tunneling through an access point (AP).

FIG. 4B shows an example wireless network 400B that includes the STA 410 and earbuds 420 described with reference to FIG. 4A. The wireless network 400B is similar to the wireless network 400A of FIG. 4A, except that the primary and secondary earbuds (P and S, respectively) in the example of FIG. 4B have direct communication links 430A and 430B, respectively, with the STA 410. In this example, the STA 410 may transmit a data stream to each of the primary earbud (P) and the secondary earbud (S) via respective communication links 430A and 430B, concurrently.

Figures 5A, 5B:
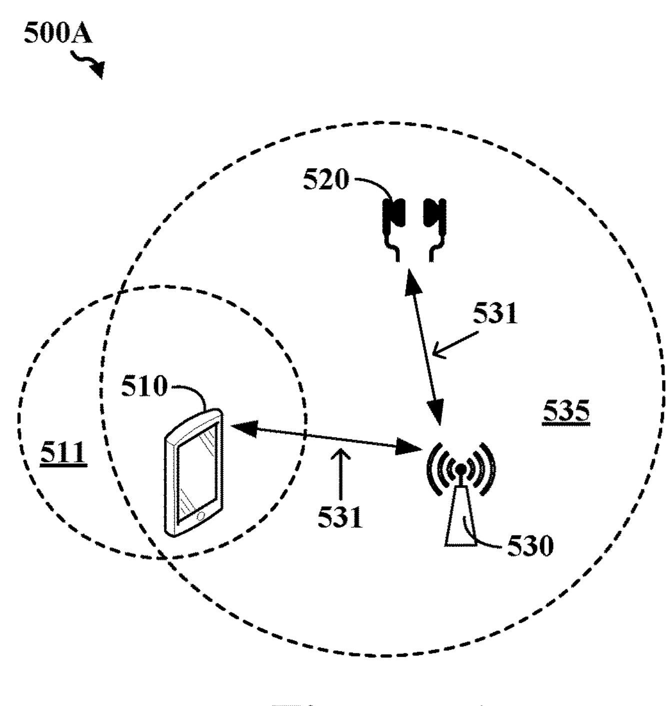
FIGS. 5A-5B show example topologies of other wireless networks that support wireless communications using the BToIP protocol disclosed herein.

FIGS. 5A-5B show example topologies of other wireless networks 500A and 500B that support wireless communications using the BToIP disclosed herein. The wireless network 500A of FIG. 5A is shown to include a STA 510, a pair of earbuds 520 that may be paired with the STA 510 via a Bluetooth connection, and an AP 530. In some implementations, the STA 510 may be one example of the central device 102 of FIG. 1, and the earbuds 520 may be one example of the peripheral device 112 of FIG. 1. The AP 530 may operate a BSS on one or more wireless channels, and may provide a wireless coverage area 535 for WLAN communications over the one or more wireless channels. The STA 510 may be associated with the AP 530, and may receive data streams directly from the AP 530 over one or more WLAN channels 531. The STA 510 may also provide a wireless coverage area 511 for Bluetooth communications with the earbuds 520.

In the example of FIG. 5A, the earbuds 520 are located outside of the Bluetooth coverage area 511 provided by the STA 510, and therefore the STA 510 may not be able to transmit a data stream to the earbuds 520 via the Bluetooth connection. In various aspects, the earbuds 520 may also be associated with the AP 530. Specifically, the earbuds 530 may operate as a client device of the AP 530, and may receive data streams directly from the AP 530 over the one or more WLAN channels 531 based on the BToIP disclosed herein.

FIG. 5B shows an example wireless network 500B that includes the STA 510 and the earbuds 520 described with reference to FIG. 5A. In the example of FIG. 5B, the earbuds 520 are located within a wireless coverage area 512 provided by the STA 510. As such, the STA 510 and earbuds 520 may communicate with each other directly, without the presence of an AP, using a communication link 540. In various aspects, the communication link 540 allows the STA 510 and the earbuds 520 to exchange data and other information with each other based on the BToIP protocol disclosed herein. The communication link 540 may be any suitable contention-based communication link that allows the STA 510 and the peripheral device 520 to communicate with each other using WLAN-compliant data packets. In some aspects, the communication link 540 may be a Wi-Fi link such as (but not limited to) a P2P link, a TDLS link, or a Wi-Fi Direct link.

Figure 6:
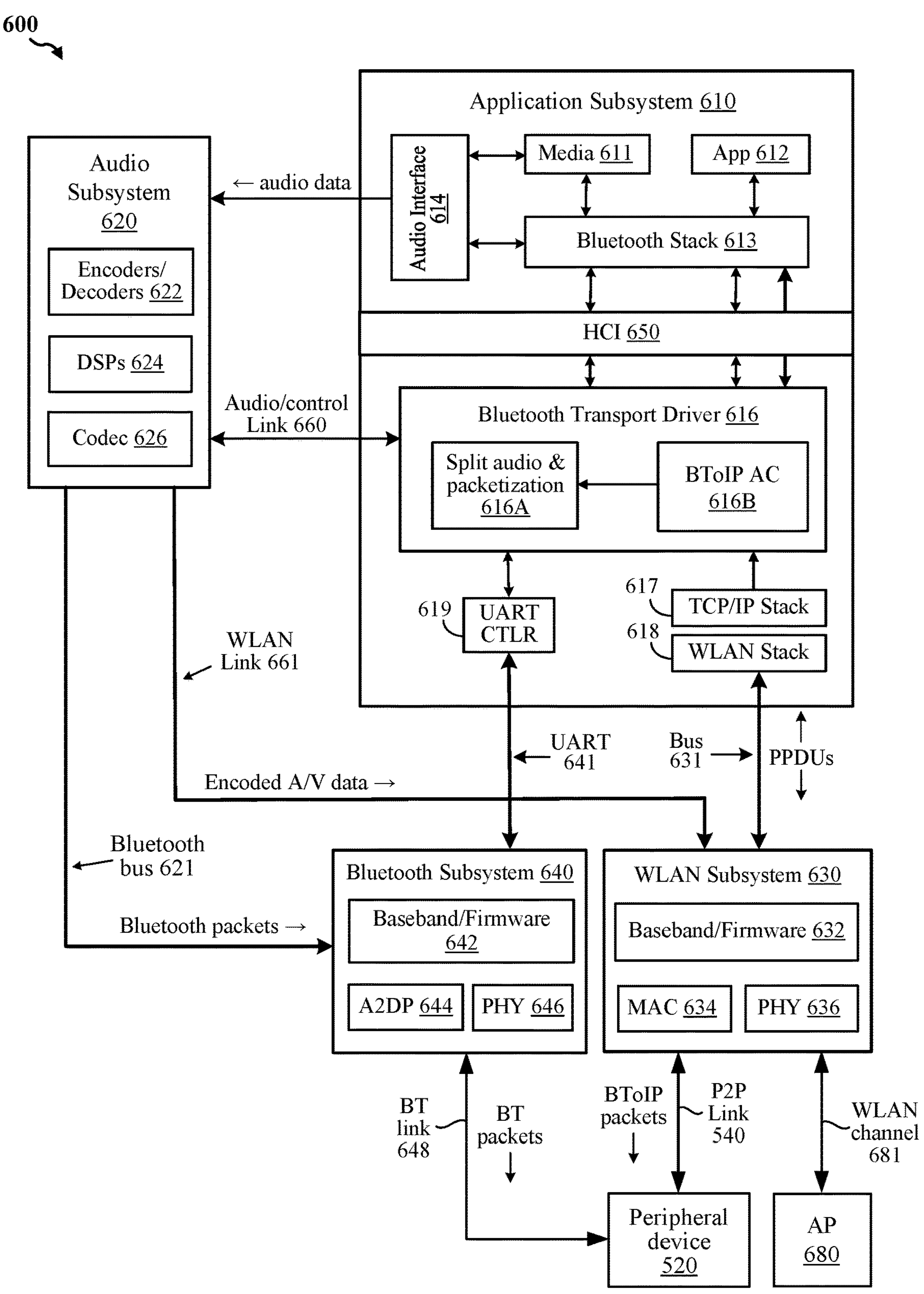
FIG. 6 shows a block diagram of another example wireless device, according to various aspects of the present disclosure.

FIG. 6 shows a block diagram of another example wireless device 600, according to various aspects of the present disclosure. In some implementations, the wireless device 600 may be an example of the central device 102 of FIG. 1, the wireless device 200 of FIG. 2, or the wireless device 510 of FIGS. 5A-5B. In some instances, the wireless device 600 may operate as a STA that can transmit data to and receive data from an associated AP 680 over a wireless channel 681 of a WLAN, while also operating as a softAP that can transmit data to and receive data from the peripheral device 520 over a contention-based communication link (such as the P2P link 540) using the BToIP protocol disclosed herein. In some instances, the peripheral device 520 may be paired with the wireless device 600 based on the Bluetooth or BLE protocol. For example, in some aspects, the peripheral device 520 may be a pair of earbuds or headphones that can exchange Bluetooth-encoded data and other signals with the wireless device 600 over a Bluetooth link 648 using a Bluetooth or BLE protocol, and can also exchange Bluetooth-encoded data and other signals with the wireless device 600 over the P2P link 540 using the BToIP protocol disclosed herein.

The wireless device 600 may include an Application Processing subsystem 610, an audio subsystem 620, a WLAN subsystem 630, a Bluetooth subsystem 640, and a Host Controller Interface (HCI) 650. The Application Processing subsystem 610, which may correspond to at least some portions of the application layer and the Host block of the BToIP protocol stack 300 of FIG. 3, is shown to include a media player 611, an Application Layer (App) 612, a Bluetooth stack 613, and an audio interface 614. The media player 611 can be suitable device or component capable of generating or receiving multimedia content including, for example, real-time audio streams, real-time video streams, real-time gaming streams, and other latency-sensitive traffic. The App 612, which may be one implementation of the App 308 of FIG. 3, includes at least one Bluetooth profile that defines the collection of attributes and associated permissions to be used in Bluetooth or BLE communications. In some aspects, the App 612 may include processing resources including (but not limited to) the memory 206, the ROM 208, and the Flash memory 210 of FIG. 2. The Bluetooth stack 613 may be one implementation of the BToIP protocol stack 300 of FIG. 3.

The Bluetooth transport driver 616 may include a split audio and packetization module 616A and a BToIP AC 616B. The split audio and packetization module 616A may be responsible for packetizing data (such as audio and/or video data) into Bluetooth frames that can be transmitted to the peripheral device 520 using either a Bluetooth/BLE protocol or the BToIP protocol disclosed herein. The BToIP AC 616B, which may be one example of the BToIP AC 356 of FIG. 3, may be configured to encapsulate Bluetooth packets in a manner that indicates whether the Bluetooth packets are to be transmitted using the Bluetooth/BLE protocol or the BToIP protocol disclosed herein, as described with reference to FIG. 3. For example, the BToIP AC 616B may add headers to the Bluetooth packets indicating that the Bluetooth packets are to be transmitted to the peripheral device 520 using the BToIP protocol disclosed herein. The BToIP AC 616B may also be configured to decapsulate data packets received based on the BToIP protocol and forward the decapsulated data to other layers of the Bluetooth stack 613. Further, although shown in the example of FIG. 6 as provided in the Host, in other implementations, the BToIP AC 616B may be provided within the WLAN subsystem 630.

The Bluetooth transport driver 616 is connected to the audio subsystem 620 via an audio and the A/V control link 660. In some instances, the A/V control link 660 may be used to send encoded audio/video data and control signals between the Bluetooth transport driver 616 and audio/video DSPs within the audio subsystem 620. The TCP/IP stack 617 allows the wireless device 600 to exchange data and control information with corresponding layers of a TCP/IP stack implemented in the peripheral device 520. For example, the TCP/IP stack 617 may be used to format frames or packets for transmission based on the TCP/IP transmission protocol, and may be used to extract data from frames or packets received based on the TCP/IP transmission protocol.

The WLAN stack 618 allows the wireless device 600 to exchange data and control information with corresponding layers of a WLAN stack implemented in the AP 680. For example, the WLAN stack 618 may be used to format frames or packets for transmission as IEEE 802.11-compliant PPDUs to the AP 680 over the WLAN channel 681, and may be used to extract data from IEEE 802.11-compliant PPDUs received from the AP 680 over the WLAN channel 681. In some instances, the WLAN stack 618, the TCP/IP stack 617, and the UART controller 619 may correspond to a Kernel space of the Application subsystem 610. The UART 641, which is managed by the UART controller 619, provides a 3-wire interface (e.g., a transmit wire, a receive wire, and a ground wire) between the application processing subsystem 610 and the Bluetooth subsystem 630. A bus 631 provides a connection between the WLAN stack 618 and the WLAN subsystem 630. The bus 631 may be any suitable bus, signal line, or signaling that can be used to exchange PPDUs, control information, and other signals between the WLAN stack 618 and the WLAN subsystem 630. For example, in some aspects, the bus 631 may be a PCIe bus, a soundwire, an Inter-IC Sound (I2S) bus, and the like.

The audio subsystem 620 may include encoders/decoders 622, one or more digital signal processors (DSPs) 624, and one or more codecs 626. The encoders/decoders 622 may be used to sample audio/video data extracted from one or more PPDUs received over the WLAN channel 681 and processed in the Application block 610 based at least in part on a Bluetooth profile. In some implementations, the encoders/decoders 622 may partition the sampled audio/video data into payloads that can be embedded within one or more Bluetooth packets for transmission to the peripheral device 520 over the Bluetooth link 648. In some other implementations, the encoders/decoders 622 may partition the sampled audio/video data into Ethernet frames or packets that can be encapsulated within IEEE 802.11-compliant PPDUs for transmission to the peripheral device 520 over the P2P link 540. In some instances, the DSPs 624 and/or the codecs 626 may employ one or more encoding or decoding algorithms in conjunction with sampling the audio data.

The WLAN subsystem 630 may include a WLAN baseband circuit and firmware block 632, a MAC layer 634, and a PHY 636. The WLAN firmware may control operations of the WLAN subsystem 630, and may determine the protocol and configuration of one or both of the MAC layer 634 or the PHY 636. The WLAN baseband circuit may decode and/or process received data at baseband frequency, and may process and encode outgoing data at baseband frequency. The MAC layer 634 and the PHY 636 are collectively responsible for embedding outgoing data into MAC frames (such as MSDUs), encapsulating the MAC frames into data packets (such as PPDUs), and transmitting the data packets over the WLAN channel 681 to one or more other wireless devices. The MAC layer 634 and the PHY 636 are also collectively responsible for receiving data packets (such as PPDUs) over the WLAN channel 681, extracting data from the MAC frames encapsulated in the received data packets, and decoding the extracted data.

Specifically, when the WLAN subsystem 630 is in a receive mode, the PHY 636 may be used to receive, demodulate, and down-convert PPDUs received over the wireless channel 681, and the MAC layer 634 may be used to decode data encapsulated in the received PPDUs. The MAC layer 634 may also forward the decoded data to the application layer via the HCI 650. When the WLAN subsystem 630 is in a transmit mode, the MAC layer 634 may be used to construct and format MAC frames to carry data provided by the upper layers, and the PHY 636 may encapsulate the MAC frames within one or more PPDUs for transmission over the WLAN channel 681. In some aspects, the PHY 636 may define the mechanism for transmitting A/V bitstreams to the peripheral device 520 over the P2P link 540 based on the BToIP protocol disclosed herein.

The Bluetooth subsystem 640 may include a Bluetooth baseband circuit and firmware block 642, an advanced audio distribution profile (A2DP) circuit 644, and a PHY 646. The Bluetooth baseband circuit and firmware block 642 may be used to generate baseband signals for constructing and deconstructing data frames based on the Bluetooth or BLE protocol. The Bluetooth baseband circuit and firmware block 642 may also be used to generate carrier signals for up-converting baseband signals during data transmissions and for down-converting received data signals to baseband. The A2DP circuit 644 may be used to control or manage an A2DP link between the wireless device 600 and the peripheral device 520. Specifically, when the Bluetooth subsystem 640 is in a receive mode, the PHY 646 can be used to receive, demodulate, and down-convert data packets received over the Bluetooth link or connection 648, and to forward the data packets to the application processing subsystem 610. When the Bluetooth subsystem 640 is in a transmit mode, the PHY 646 can be used to encapsulate data provided from the upper layers into one or more Bluetooth frames or packets for transmission to the peripheral device 520 over the Bluetooth link or connection 648.

In various aspects, the wireless device 600 may include a WLAN link 661 connected between the audio subsystem 620 and the WLAN subsystem 630. The WLAN link 661 may provide a direct link or channel over which Bluetooth-encoded audio/video data can be sent from the audio subsystem 620 to the WLAN subsystem 630 without passing through or accessing the Application Processing subsystem 610. Specifically, the WLAN link 661 may allow Bluetooth-encoded data to be forwarded directly from the audio subsystem 620 to the WLAN subsystem 630 for transmission to the peripheral device 520 over the P2P link 540 without consuming processing cycles of the application processor, thereby avoiding latencies associated with the application processor and also avoiding latencies associated with the TCP/IP stack 617. In this way, the WLAN link 661 can reduce jitter and latency by directly routing Bluetooth-encoded data from the audio subsystem 620 to the WLAN subsystem 630.

In some implementations, streaming media (e.g., audio streams and/or video streams) generated by microphones associated with the peripheral device 520 may be transmitted to the wireless device 600 according to the Real-time Transport Protocol (RTP). The RTP is a network protocol designed for end-to-end, real-time transmission of streaming media over a wireless medium in a manner that favors the timely delivery of streaming media over reliability. For example, in an RTP session, audio and/or video (A/V) samples are encoded and embedded within the payloads of RTP packets, and one or more bursts of RTP packets are transmitted to a receiving device. Each RTP packet includes an RTP header indicating at least a Payload Type (PT), an RTP profile, a sequence number, a timestamp, a synchronization source (SSRC), one or more Contributing Source (CSRC) identifiers, and one or more extension headers. The RTP profile defines the codecs used to encode the payload data and their mapping to payload format codes carried in the PT field of the RTP header. The sequence number is incremented for each RTP packet, and can be used by the receiving device to detect packet loss and to accommodate out-of-order delivery of RTP packets. The timestamp may be used by the receiver to play back media samples for a user at the appropriate times. The SSRC may uniquely identify the source of a media stream, and the CSRC identifiers may indicate each source that contributed to a media stream (e.g., when the media stream is generated from multiple sources).

Figure 7:
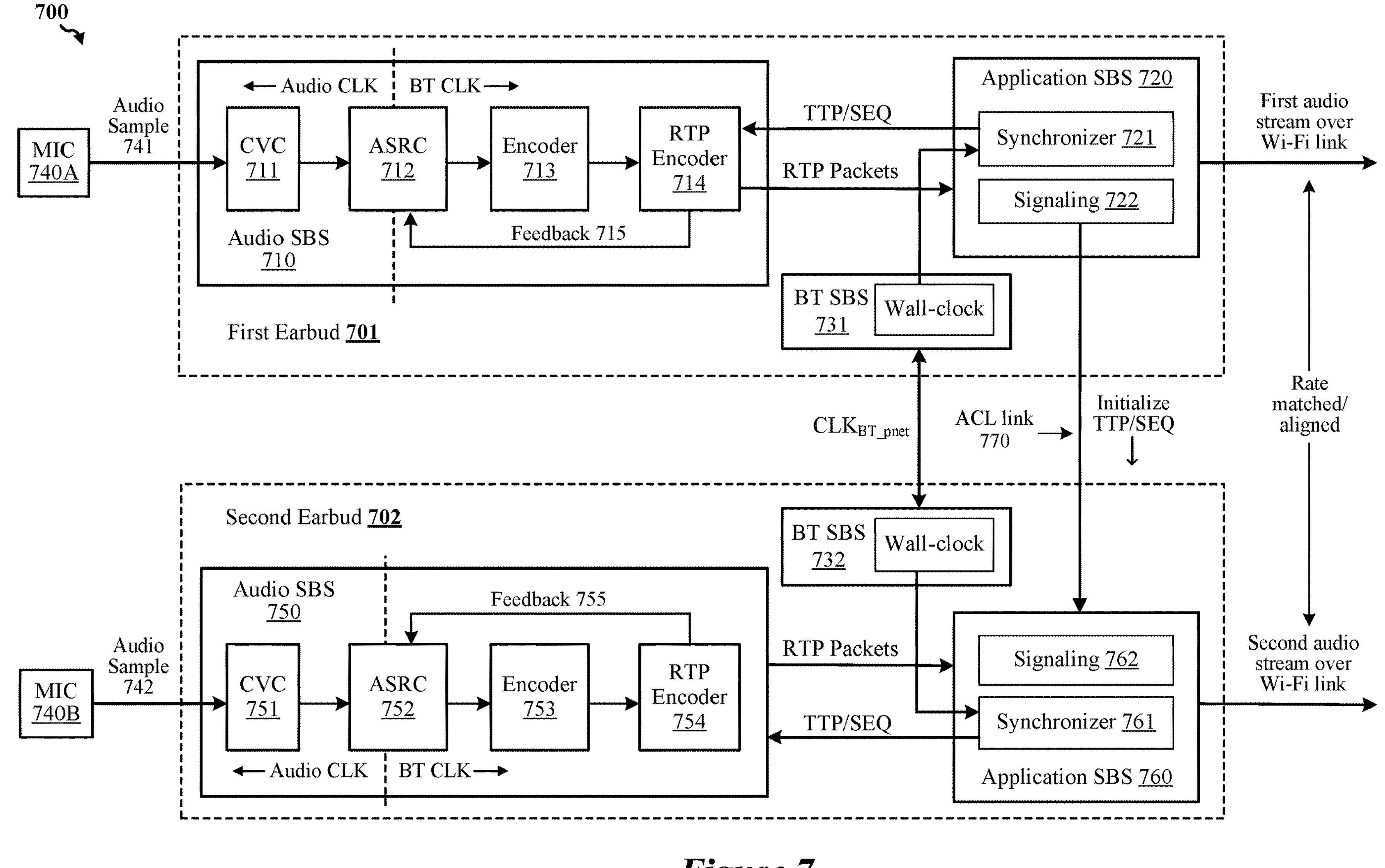
FIG. 7 shows a block diagram of a peripheral device that supports streaming Bluetooth audio to a wireless device over a Wi-Fi link, according to various aspects of the present disclosure.

FIG. 7 shows a block diagram of a peripheral device 700 that supports streaming Bluetooth audio to a wireless device over a Wi-Fi link, according to certain aspects of the disclosure. In the example of FIG. 7, the peripheral device 700 is a pair of earbuds that includes a first earbud 701 and a second earbud 702 separated from each other by a distance. The first earbud 701 is shown to include a first microphone (MIC) 740A, an audio subsystem 710, an application subsystem 720, and a Bluetooth subsystem 731. The second earbud 702 is shown to include a second MIC 740B, an audio subsystem 750, an application subsystem 760, and a Bluetooth subsystem 732. In some instances, the respective audio subsystems 710 and 750 of the first and second earbuds 701 and 702 may be examples of the audio subsystem 620 of FIG. 6, the respective application subsystems 720 and 760 of the first and second earbuds 701 and 702 may be examples of the application subsystem 610 of FIG. 6, and/or the respective Bluetooth subsystems 731 and 732 of the first and second earbuds 701 and 702 may be examples of the Bluetooth subsystem 640 of FIG. 6.

Referring to the first earbud 701, the audio subsystem 710 may include a clear voice capture (CVC) 711, an asynchronous sample rate converter (ASRC) 712, a Bluetooth encoder 713, and a Real-time Transport Protocol (RTP) encoder 714. The first MIC 740A samples or records audio associated with the first earbud 701, and forwards the first audio samples 741 to the CVC 711. In some instances, the first MIC 740A may capture a user's voice at a position in or near one of the user's ears (such as the right ear). The CVC 711 receives the first audio samples 741 from the first MIC 740A, filters out background noise and other interference, and provides the filtered audio samples to the ASRC 712.

Referring to the second earbud 702, the audio subsystem 750 may include a CVC 751, an ASRC 752, a Bluetooth encoder 753, and an RTP encoder 754. The second MIC 740B samples or records audio associated with the second earbud 702, and forwards the second audio samples 742 to the CVC 751. In some instances, the second MIC 740B may capture the user's voice at a position in or near the user's other ear (such as the left ear). The CVC 751 receives the second audio samples 742 from the second MIC 740B, filters out background noise and other interference, and provides the filtered audio samples to the ASRC 752.

In some implementations, the first and second earbuds 701 and 702 may include multiple clock domains. For example, the first earbud 701 may include an audio clock domain and a Bluetooth clock domain. The audio clock domain includes the first MIC 740A and the CVC 711, and the Bluetooth clock domain includes the Bluetooth encoder 713 and the RTP encoder 714. Specifically, the audio clock may be used to sample audio received by the first MIC 740A of the first earbud 701, and may be used by the CVC 711 to capture and process the first audio samples 741. The Bluetooth clock, which may have a frequency different than the audio clock frequency, may be used by the encoder 713 to encode the first audio samples. The Bluetooth clock may also be used by the RTP encoder 714 to encode audio associated with the first audio stream into a plurality of RTP packets suitable for transmission to the wireless device over the wireless link.

The Bluetooth subsystem 731 of the first earbud 701 may be responsible for transmitting and receiving Bluetooth packets over a Bluetooth or BLE connection to the associated device and/or to the first earbud 701. The Bluetooth subsystem 731 is shown to include at least a first wall-clock (other circuits, components, and devices associated with the Bluetooth subsystem 731 are not shown in FIG. 7 for simplicity). The first wall-clock may be an independent clock or time value to which various transmission timing parameters of the first audio stream can be referenced. Similarly, the Bluetooth subsystem 732 of the second earbud 702 may be responsible for transmitting and receiving Bluetooth packets over a Bluetooth or BLE connection to the associated device and/or to the first earbud 701. The Bluetooth subsystem 732 is shown to include at least a second wall-clock (other circuits, components, and devices associated with the Bluetooth subsystem 732 are not shown in FIG. 7 for simplicity). The second wall-clock may be an independent clock or time value to which various transmission timing parameters of the second audio stream can be referenced.

The ASRC 712 has an input terminal coupled to the CVC 711, has an output terminal coupled to the encoder 713, and has a control terminal to receive a feedback signal 715. The ASRC 712 may provide an interface between the audio clock domain and the Bluetooth clock domain of the first earbud 701. Specifically, the ASRC 712 may convert the first audio samples 741 from the audio clock domain to the Bluetooth clock domain based on a sample rate conversion ratio. That is, while the first audio samples 741 provided as input to the ASRC 712 may have a sampling rate based on the audio clock, the first audio samples output from the ASRC 712 may have a sampling rate based on the Bluetooth clock.

In some instances, the sample rate conversion ratio may be based on one or more of transmission latencies, sampling rates, and timing information associated with transmission of the first audio stream over a Wi-Fi link to an associated wireless device (such as the wireless device 600 of FIG. 6). For example, in some instances, the ASRC 712 may select or adjust the sample rate conversion ratio based on a feedback signal 715 indicating values of the TTP and the RTP sequence number for the first earbud 701. In some aspects, the feedback signal 715 may be provided by the RTP encoder 714 based on the TTP, the sequence number, and timing information provided by the synchronizer 721 of the first earbud 701.

The rate-adjusted audio samples output from the ASRC 712 may be encoded into Bluetooth frames by the encoder 713, and then forwarded to the RTP encoder 714. The RTP encoder 714 includes an input terminal to receive the encoded Bluetooth frames from the encoder 713, a control terminal to receive TTP values and sequence numbers from the Application subsystem 720, and an output terminal coupled to the Application subsystem 720. In some instances, the RTP encoder 714 encodes the rate-adjusted audio samples carried in the Bluetooth frames into RTP packets, and prepends an RTP header to each of the RTP packets. In some instances, the RTP header indicates an RTP profile and payload format of the respective RTP packet. The RTP profile may indicate the codecs used by the RTP encoder 714 to encode audio data into the RTP packets and their corresponding mappings to payload format codes carried in the protocol field Payload Type (PT) of the RTP header. In some aspects, the RTP header may also indicate that audio data carried in the respective RTP packets is latency-sensitive traffic.

Referring to the second earbud 702, the ASRC 752 has an input terminal coupled to the CVC 751, has an output terminal coupled to the encoder 753, and has a control terminal to receive a feedback signal 755. The ASRC 752 may provide an interface between the audio clock domain and the Bluetooth clock domain of the second earbud 702. Specifically, the ASRC 752 may convert the second audio samples 742 from the audio clock domain to the Bluetooth clock domain based on a sample rate conversion ratio. That is, while the second audio samples 742 provided as input to the ASRC 752 may have a sampling rate based on the audio clock, the second audio samples output from the ASRC 752 may have a sampling rate based on the Bluetooth clock. The sample rate conversion ratio may be based on one or more of transmission latencies, sampling rates, and timing information associated with transmission of the second audio stream over the wireless link to the associated device. For example, in some instances, the ASRC 752 may select or adjust the sample rate conversion ratio based on a feedback signal 755 indicating values of the TTP and the RTP sequence number for the second earbud 702. In some aspects, the feedback signal 755 may be provided by the RTP encoder 754 based on the TTP, the sequence number, and timing information provided by the synchronizer 761 of the second earbud 702.

The rate-adjusted audio samples output from the ASRC 752 may be encoded into Bluetooth frames by the encoder 753, and then forwarded to the RTP encoder 754. The RTP encoder 754 includes an input terminal to receive the encoded Bluetooth frames from the encoder 753, a control terminal to receive TTP values and sequence numbers from the Application subsystem 760, and an output terminal coupled to the Application subsystem 760. In some instances, the RTP encoder 754 encodes the rate-adjusted audio samples carried in the Bluetooth frames into RTP packets, and prepends an RTP header to each of the RTP packets. As discussed, the RTP header indicates an RTP profile and payload format of the respective RTP packet. In some aspects, the RTP header may also indicate that audio data carried in the respective RTP packets is latency-sensitive traffic.

The application subsystem 720 of the first earbud 701 is coupled to the RTP encoder 714 and the Bluetooth subsystem 731. Although shown in the example of FIG. 7 as including only a synchronizer 721 and a signaling circuit 722 for simplicity, in other implementations, the application subsystem 720 can include other circuits, components, and devices. In some instances, the application subsystem 720 of the first earbud 701 may be configured to format or prepare RTP packets corresponding to the first audio stream for transmission. Similarly, the application subsystem 760 of the second earbud 702 is coupled to the RTP encoder 754 and the Bluetooth subsystem 732. Although shown in the example of FIG. 7 as including only a synchronizer 761 and a signaling circuit 762 for simplicity, in other implementations, the application subsystem 760 can include other circuits, components, and devices. In some instances, the application subsystem 760 of the second earbud 702 may be configured to format or prepare RTP packets corresponding to the second audio stream for transmission.

In some implementations, the signaling circuit 722 of the first earbud 701 may be coupled to the signaling circuit 762 of the second earbud 702 via a Bluetooth Asynchronous Connection-Less (ACL) link 770 between the first and second earbuds 701 and 702. The signaling circuits 722 and 762 of the first and second earbuds 701 and 702, respectively, can exchange messages, frames, signals, data, and other information with each other over the ACL link 770. For example, in some instances, the signaling circuit 722 of the first earbud 701 may send a message to the second earbud 702 that includes the initial values of the TTP and sequence number selected by the first earbud 701. In some aspects, the message can initialize various states of the second earbud 702 to match corresponding states of the first earbud 701. By exchanging messages and other information directly between the first and second earbuds 701 and 702 over the ACL link 770, aspects of the present disclosure may ensure that the TTP values and RTP sequence numbers applied by the RTP encoder 714 to the first audio data can be synchronized with the TTP values and RTP sequence numbers applied by the RTP encoder 754 to RTP packets associated with the second audio stream, for example, without communicating with the associated device. In this way, aspects of the present disclosure may ensure that the RTP packets transmitted by the first earbud 701 are temporally aligned with the RTP packets transmitted by the second earbud 702.

As discussed, the application subsystem 720 of the first earbud 701 may determine a TTP value indicating the time at which the first RTP packet associated with the first audio stream is to be transmitted from the first earbud 701 to the associated device. The TTP value may be embedded within the first RTP packet of the first audio stream and transmitted to the associated device. Similarly, the application subsystem 760 of the second earbud 702 may determine a TTP value indicating the time at which the first RTP packet associated with the second audio stream is to be transmitted from the second earbud 702 to the associated device. In some implementations, the TTP values may be embedded within corresponding RTP packets associated with one or both of the first and second audio streams transmitted to the associated device. In this way, the associated device can use the TTP values carried in RTP packets received over the Wi-Fi link to determine the time at which audio samples carried in corresponding RTP packets are to be played for the user.

In some implementations, the application subsystem 720 of the first earbud 701 may periodically obtain the wall-clock value from the Bluetooth subsystem 731, and may use the obtained wall-clock value to adjust the TTP values assigned to RTP packets associated with the first audio stream. Similarly, the application subsystem 760 of the second earbud 702 may periodically obtain the wall-clock value from the Bluetooth subsystem 732, and may use the obtained wall-clock value to adjust the TTP values assigned to RTP packets associated with the second audio stream. In some instances, the first earbud 701 and the second earbud 702 may synchronize TTP values and RTP sequence numbers with each other. For example, the application subsystem 720 of the first earbud 701 may provide its initial TTP value and RTP sequence number to the application subsystem 760 of the second earbud 702 using the ACL link 770 between the first earbud 701 and the second earbud 702. Specifically, in some aspects, the signaling circuit 722 of the first earbud 701 may send an initialization message to the application subsystem 760 of the second earbud 702 over the ACL link 770. The initialization message may initialize an operating state of the second earbud 702 to the same as (or similar to) the operating state of the first earbud 701.

In some implementations for which the first and second earbuds 701 and 702 are associated with an AP (such as the same AP with which the wireless device is associated), the Timing Synchronization Function (TSF) of the AP can be used as a reference for rate matching and temporally aligning the audio streams output from the first and second earbuds 701 and 702 with each other. In other implementations, a Bluetooth piconet clock (CLKBT_PNET) shared between the first earbud 701 and the second earbud 702 can be used as a reference clock for rate matching and temporally aligning their respective audio streams with each other. Using the Bluetooth piconet clock for rate matching and packet alignment, rather than the TSF of an associated AP, may allow the first and second earbuds 701 and 702 to be associated with different APs.

As discussed above, the first earbud 701 may determine or obtain initial values for the TTP and RTP sequence number, and then provides these initial values to the second earbud 702. Thereafter, the first and second earbuds 701 and 702 can synchronize their local clocks with each other using the Bluetooth piconet clock and/or the TSF of an associated AP, for example, such that the TTP values and RTP sequence numbers associated with the first audio stream output from the first earbud 701 are synchronized with the TTP values and RTP sequence numbers associated with the second audio stream output from the second earbud 702. In this way, the sample rate conversion ratio applied to the first audio samples by the ASRC 712 of the first earbud 701 may be synchronized with the sample rate conversion ratio applied to the second audio samples by the ASRC 752 of the second earbud 702, for example, so that the.

The RTP encoder 714 may also obtain the SSRC values specified by the application subsystem 720. In some aspects, the TTP value used in the first earbud 701 may be referenced to local audio clock, and may track the wall-clock. Similarly, the TTP value used in the second earbud 702 may be referenced to local audio clock, and may track the wall-clock.

Figure 8:
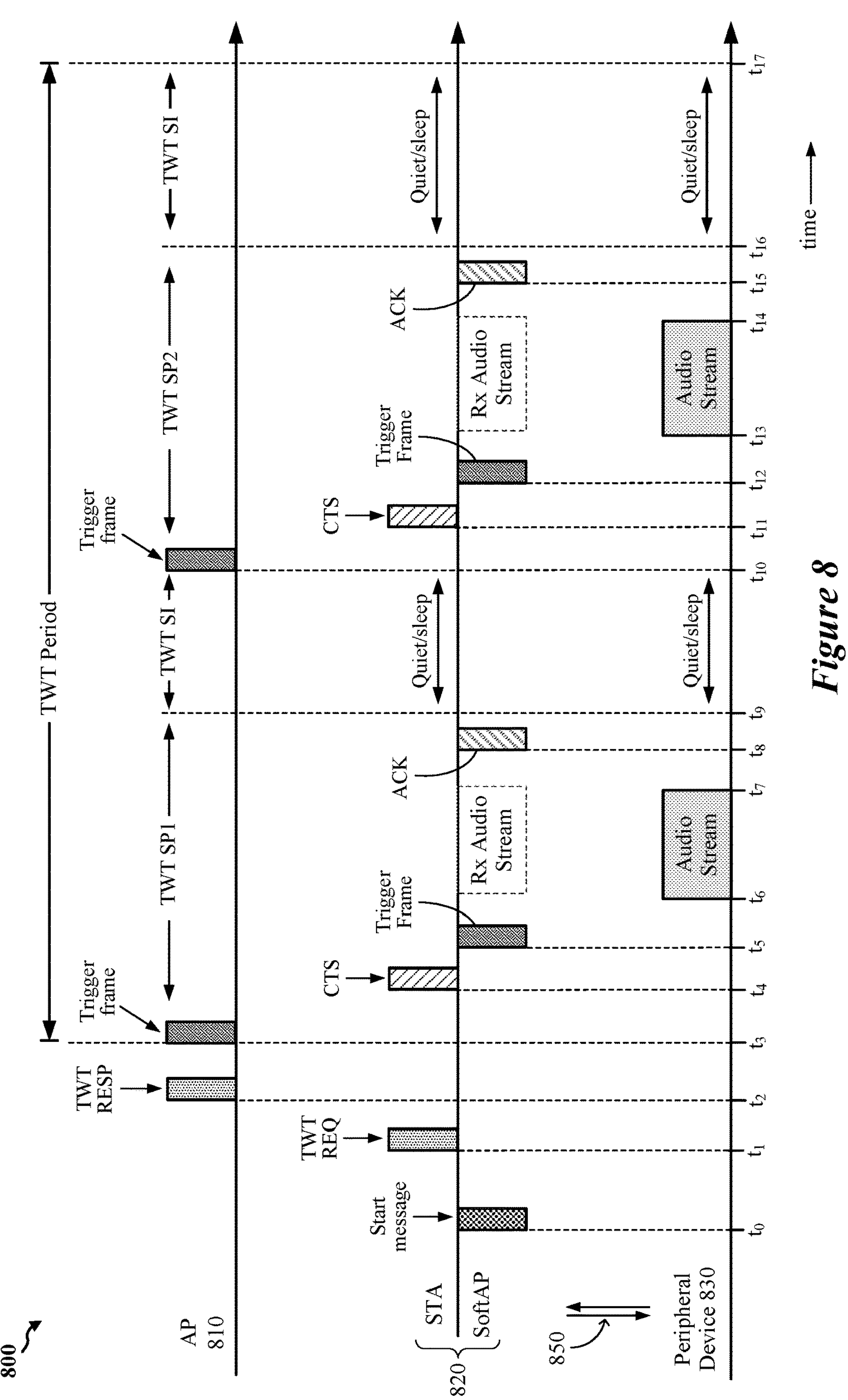
FIG. 8 shows a timing diagram depicting an example wireless communication that supports streaming Bluetooth audio to a wireless device over a Wi-Fi link, according to various aspects of the present disclosure.

FIG. 8 shows a timing diagram depicting an example wireless communication 800 that supports streaming Bluetooth audio to a wireless device over a Wi-Fi link, according to various aspects of the present disclosure. In some implementations, the wireless communication 800 may be performed between an access point (AP) 810, a wireless device 820, and a peripheral device 830. The AP 810 may be any suitable access point or access terminal that can operate a basic service set (BSS) on a wireless medium. The wireless device 820 may be an example of the central device 102 of FIG. 1, the wireless device 200 of FIG. 2, or the wireless device 600 of FIG. 6. The peripheral device 830 may be an example of the peripheral devices 108 or 112 of FIG. 1, the earbuds 420 of FIGS. 4A-4B, the earbuds 520 of FIGS. 5A-5B, or the peripheral device 700 of FIG. 7.

The wireless device 820 may operate as a STA that can transmit data to and receive data from the AP 810 over one or more wireless channels associated with the BSS, while also operating as a softAP that can transmit data to and receive data from the peripheral device 830 over at least some of the wireless channels associated with the BSS. In some instances, the wireless device 820 and the peripheral device 830 may be paired with each other via a Bluetooth or BLE connection over which the wireless device 820 and the peripheral device 830 can exchange data and other information via a Bluetooth or BLE communication protocol. In various aspects, the wireless device 820 and the peripheral device 830 may exchange Bluetooth-encoded data (such as streaming audio or streaming video) with each other by encapsulating the Bluetooth-encoded data into WLAN-compliant data packets (such as PPDUs) that can be transmitted to one another over the wireless channel or link. For example, in some instances, the peripheral device 830 can embed audio samples associated with streaming audio into Real-time Transport Protocol (RTP) packets that can be carried over the wireless link in one or more WLAN-compliant PPDUs. In some aspects, the wireless link may be one or more of a P2P link, a TDLS link, a Wi-Fi Direct link, or a Neighborhood Area Network (NAN) link.

The wireless link 850 may be a channel or communication link in at least one of a 2.4 GHz frequency band, a 5 GHz frequency band, or a 6 GHz frequency band. The ability to stream media in real-time from the peripheral device 830 to the wireless device 820 using channels or links located in different frequency bands may allow the peripheral device 830 to avoid congestion and interference associated with the 2.4 GHz frequency band. For example, when latencies associated with Wi-Fi channels in the 2.4 GHz frequency band are relatively poor (e.g., due to interference from other Wi-Fi devices and/or Bluetooth devices operating in the 2.4 GHz frequency band), the wireless link may be configured in the less-crowded 6 GHz frequency band. In this way, the peripheral device 830 can stream media to the wireless device 820 over a Wi-Fi channel or link in the 6 GHz frequency band, thereby avoiding interference and congestion associated with the 2.4 GHz frequency band.

In some implementations, the wireless device 820 and the peripheral device 830 may be associated with latency-sensitive traffic having strict end-to-end latency, throughput, and timing requirements. Example latency-sensitive traffic may include (but is not limited to) real-time audio streams, real-time video streams, real-time gaming applications, video communications, and traffic associated with augmented reality (AR) and virtual reality (VR) applications (collectively referred to as extended reality (XR) applications). In some instances, the STA of the wireless device 820 may be a member of a Target Wake Time (TWT) operation established or scheduled by the AP 810. For simplicity, only one STA is shown as a member of the TWT operation depicted in FIG. 8. In some other instances, the TWT operation may include fewer or more STAs than depicted in the example of FIG. 8.

In some implementations, the AP 810 may establish the TWT operation for STAs associated with latency-sensitive traffic. The TWT operation may include one or more TWT service periods (SPs) allocated for communications associated with members of the TWT operation. The AP 810 may advertise the TWT operation by including a TWT Element in beacon frames broadcasted to its associated STAs. The TWT Element may indicate the existence of the TWT operation, may indicate that the TWT operation is associated with latency-sensitive traffic, and may indicate one or more parameters for the TWT operation. For example, the TWT parameters may indicate a duration of time associated with a respective TWT SP, may indicate a time period of the TWT wake interval, may indicate whether the TWT operation is a broadcast TWT operation or an individual TWT operation, and may indicate the target wake times. The TWT Element may also indicate the operating channel and other TWT information associated with the scheduled TWT SPs.

In other implementations, the STA of the wireless device 820 may request the AP 810 to schedule one or more TWT SPs for latency-sensitive traffic between the softAP of the wireless device 820 and the peripheral device 830. In some instances, the softAP of the wireless device 820 may request the peripheral device 830 to begin streaming audio to the wireless device 820 over the wireless link 850 prior to the STA of the wireless device 820 sending a TWT request to the AP 810.

In the example of FIG. 8, the softAP of the wireless device 820 sends a Start message to the peripheral device 830, at time $t_0$. The Start message may indicate that the peripheral device 830 is to begin streaming audio to the wireless device 820 over the wireless link 850 at a specified time. In some instances, the specified time may occur prior to a start of a TWT SP by an amount of time needed by the peripheral device 830 to synchronize a pair of earbuds with each other (such as the first and second earbuds 701-702 of FIG. 7). In some aspects, the needed amount of time may correspond to rate matching and temporally aligning audio samples from the first and second earbuds of the peripheral device 830 with each other (earbuds not shown in FIG. 8 for simplicity).

At time $t_1$, the STA of the wireless device 820 transmits a TWT request frame over a wireless medium to the AP 810. The TWT request frame may request the AP 810 to schedule one or more TWT SPs on the wireless medium for streaming audio from the peripheral device 830 to the softAP of the wireless device 820. The TWT request frame may include a TWT element indicating one or more proposed TWT parameters for the requested TWT SPs. In some aspects, the TWT request frame may indicate the MAC addresses of the STA, the softAP, and the peripheral device 830.

The AP 810 receives the TWT request frame, decodes the proposed TWT parameters, and determines whether to accept, modify, or reject the proposed TWT parameters. In the example of FIG. 8, the AP 810 accepts the proposed TWT parameters, and transmits a TWT response frame to the STA at time $t_2$. The TWT response frame may confirm the TWT parameters, may indicate that the STA is a member of the TWT operation, and may include a schedule indicating one or more times at which the peripheral device 830 is to transmit the media stream. The STA receives the TWT response frame, and remains awake to receive a trigger frame from the AP 810.

At time $t_3$, the AP 810 obtains a TXOP on the wireless medium, and transmits a first trigger frame to the STA. Transmission of the first trigger frame at time $t_3$ may indicate a start of the first TWT SP. In some instances, the AP 810 may contend for channel access using a channel sensing operation (such as a clear channel assessment (CCA)) prior to obtaining the TXOP. For example, the AP 810 may sense that the wireless medium is idle for a period of time (such as a PIFS duration) before attempting to gain channel access.

The first trigger frame may be any suitable trigger frame that can allocate wireless resources to the STA of the wireless device 820 for latency-sensitive communications between the peripheral device 830 and the softAP of the wireless device 820. In some instances, the first trigger frame may include a duration field set to the time period during which the wireless medium is reserved for latency-sensitive traffic, for example, so that non-member devices that receive the trigger frame set their respective NAVs to the time period indicated by the trigger frame (and therefore do not attempt for gain channel access during the indicated time period). In some aspects, the first trigger frame may include the MAC addresses of the softAP of the wireless device 820 and the peripheral device 830, for example, so that the softAP and the peripheral device 830 do not set their respective NAVs to the indicated time period.

The first trigger frame may identify the STA of the wireless device 820 as a participant in the first TWT SP (such as by carrying the AID of the STA), and may allocate wireless resources (such as one or more RUs) for latency-sensitive traffic associated with the participants in the first TWT SP. In some instances, the first trigger frame may be a Basic trigger frame. In other instances, the first trigger frame may be a multi-user (MU) request-to-send (RTS) (MU-RTS) trigger frame, which is smaller (and thus has a shorter transmit time) than the Basic trigger frame. In some other instances, the first trigger frame may be an MU-RTS TXOP Sharing (TXS) trigger frame, which allows the AP 810 to share a portion of the TXOP with one of the participants in the first TWT SP. In some examples, the MU-RTS TXS trigger frame may include a TXOP sharing mode subfield indicating a TXOP sharing mode for latency-sensitive communications between the peripheral device 830 and the softAP of the wireless device 820. In some other instances, the first trigger frame may be another type of trigger frame.

The STA of the wireless device 820 receives the first trigger frame between times $t_3$ and $t_4$, and determines that the STA is identified by the first trigger frame. The STA may acknowledge reception of the first trigger frame by transmitting a CTS frame to the AP 810 at time $t_4$. In some instances, the CTS frame includes the MAC addresses of the softAP and the peripheral device 830, for example, so that the softAP and the peripheral device 830 do not set their respective NAVs to the time period indicated in the duration field of the CTS frame. In this way, the CTS frame may prevent the peripheral device 830 from entering a power save mode or sleep state after detecting the CTS frame, thereby ensuring that the peripheral device 830 remains awake to stream media to the wireless device 820 over the link 850 during at least a portion of the first TWT SP.

At time $t_5$, the softAP of the wireless device 820 transmits a trigger frame over the wireless link 850 to the peripheral device 830. The trigger frame, which may be a Basic trigger frame, solicits streaming audio from the peripheral device 830. The peripheral device 830 receives the trigger frame between times $t_5$ and $t_6$, and determines that the wireless link 850 is available. The peripheral device 830 transmits an audio stream to the wireless device 820 over the wireless link 850 between times $t_8$ and $t_7$.

In some implementations, the peripheral device 830 may be an example of the peripheral device 700 of FIG. 7, and may include a pair of earbuds such as the first and second earbuds 701-702 of FIG. 7. As discussed, the first earbud 701 may transmit a first audio stream to the wireless device 820 over the wireless link 850 concurrently with the second earbud 702 transmitting a second audio stream to the wireless device 820 over the wireless link 850. In some instances, the first and second audio streams may represent right/left channels of a stereo audio stream, and the sound quality (as well as the user's experience) may depend on the degree to which the first and second audio streams are rate-matched and temporally aligned with each other.

Referring also to FIG. 7, the first earbud 701 may include a microphone that samples audio received at or near the first earbud 701, and the second earbud 702 may include a microphone that samples audio received at or near the second earbud 702. The first audio samples provided by the first earbud 701 may be rate-adjusted by the ASRC 712 using a sample rate conversion ratio based on a feedback signal 715. The second audio samples provided by the second earbud 702 may be rate-adjusted by the ASRC 752 using a sample rate conversion ratio based on a feedback signal 755. In some instances, the peripheral device may use TTP values, RTP sequence numbers, timing references (such as the wall-clock or a TSF), and signaling between the first and second earbuds 701 and 702 to rate-match and align data packets (such as first RTP packets) associated with the first audio stream with corresponding data packets (such as second RTP packets) associated with the second audio stream.

The softAP of the wireless device 820 receives the first and second audio streams from the peripheral device 830 between times $t_8$ and $t_7$. In some instances, the wireless device 820 may determine whether or not the first and second audio streams are rate-matched and temporally aligned with each other based on their respective TTP values and RTP sequence numbers. When the first and second audio samples are rate-matched and temporally aligned with each other, the first and second audio streams may collectively form a stereo audio stream that can be played for a user, or transmitted to another device, without additional rate-matching or audio sample alignment.

At time $t_8$, the softAP of the wireless device 820 acknowledges reception of the first and second audio streams by transmitting an acknowledgement (ACK) frame to the peripheral device 830. At time $t_9$, the first TWT SP ends, and is followed by a TWT Service Interval (SI) between times $t_9$ and $t_{10}$. As discussed, the TWT SI may correspond to a quiet time or sleep period during which one or both of the wireless device 820 and the peripheral device 830 may enter a power save mode or sleep state to reduce power consumption. In some instances, the wireless device 820 and the peripheral device 830 wake from respective power save modes or sleep states prior to the start of the second TWT SP, at time $t_{10}$.

At time $t_{10}$, the AP 810 transmits a second trigger frame over the wireless medium. As discussed, the trigger frame may be any suitable trigger frame that can allocate wireless resources to one or more wireless devices that are members of the TWT operation and that are associated with latency-sensitive traffic. In some instances, the second trigger frame may be one of a Basic trigger frame, an MU-RTS trigger frame, or an MU-RTS TXS trigger frame. In other instances, the second trigger frame may be another type of trigger frame.

The STA of the wireless device 820 receives the second trigger frame between times $t_{10}$ and $t_{11}$, and determines that the STA is identified by the second trigger frame. The STA may acknowledge reception of the second trigger frame by transmitting a CTS frame to the AP 810 at time $t_{11}$. In some instances, the CTS frame includes the MAC addresses of the softAP and the peripheral device 830, for example, so that the softAP and the peripheral device 830 do not set their respective NAVs to the time period indicated in the duration field of the CTS frame. In this way, the CTS frame may prevent the peripheral device 830 from entering a power save mode or sleep state after detecting the CTS frame, thereby ensuring that the peripheral device 830 remains awake to stream media to the wireless device 820 over the link 850 during at least a portion of the second TWT SP.

At time $t_{12}$, the softAP of the wireless device 820 transmits a trigger frame over the wireless link 850 to the peripheral device 830. The trigger frame, which may be a Basic trigger frame, solicits streaming audio from the peripheral device 830. The peripheral device 830 receives the trigger frame between times $t_{12}$ and $t_{13}$, and determines that the wireless link 850 is available. The peripheral device 830 transmits an audio stream to the wireless device 820 over the wireless link 850 between times $t_{13}$ and $t_{14}$.

The softAP of the wireless device 820 receives the first and second audio streams from the peripheral device 830 between times $t_{13}$ and $t_{14}$. In some instances, wireless device 820 may determine whether or not the first and second audio streams are rate-matched and temporally aligned with each other based on their respective TTP values and RTP sequence numbers. As discussed, when the first and second audio samples are rate-matched and temporally aligned with each other, the first and second audio streams may collectively form a stereo audio stream that can be played for a user, or transmitted to another device, without additional rate-matching or audio sample alignment.

At time $t_{15}$, the softAP of the wireless device 820 acknowledges reception of the first and second audio streams by transmitting an ACK frame to the peripheral device 830. At time $t_{16}$, the second TWT SP ends, and is followed by a TWT SI corresponding to a quiet time or sleep period during which one or both of the wireless device 820 and the peripheral device 830 may enter a power save mode or sleep state to reduce power consumption. The communications 800 associated with the TWT operation depicted in FIG. 8 may continue as described above for zero or more TWT SPs.

Figure 9:
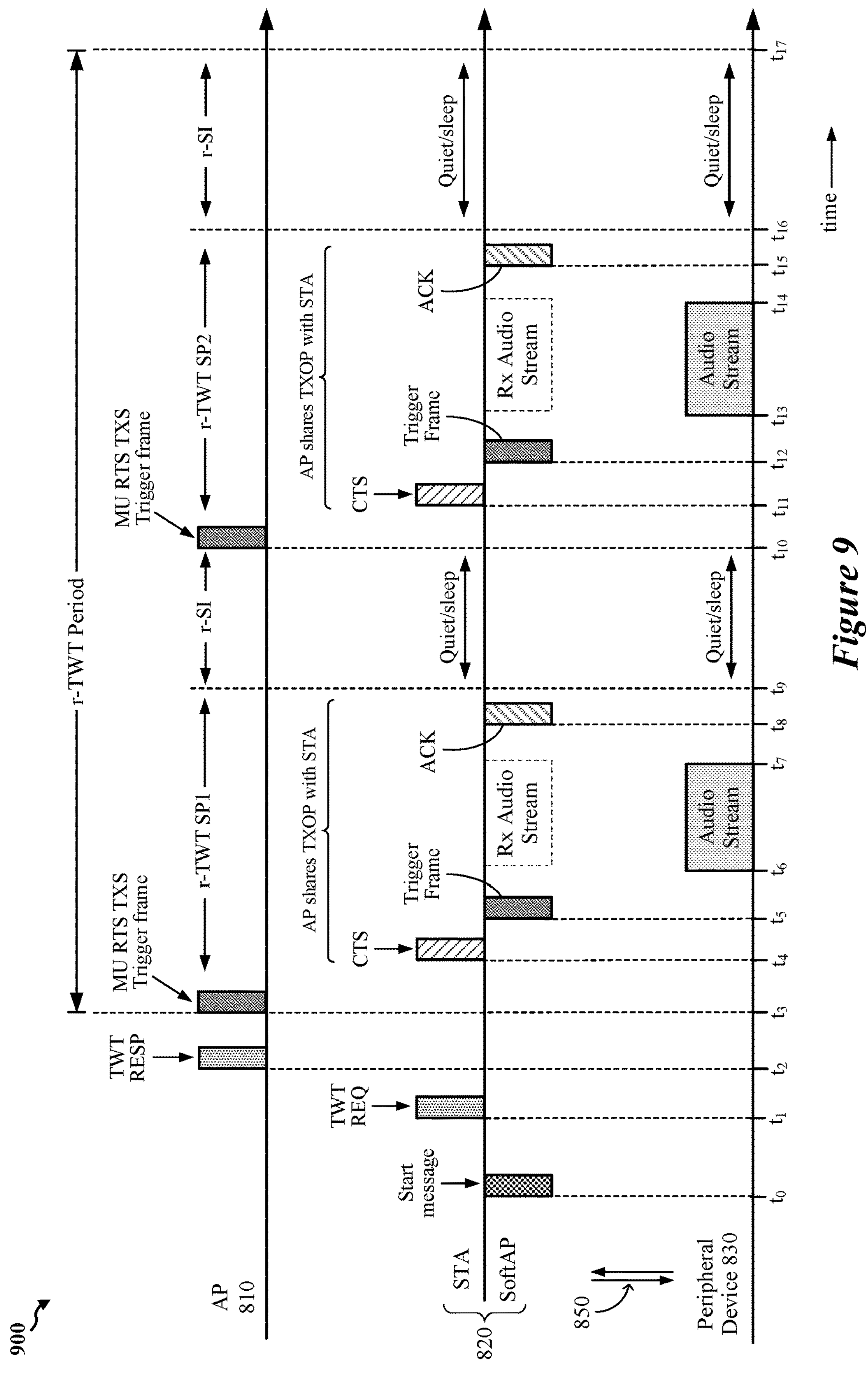
FIG. 9 shows a timing diagram depicting an example wireless communication that supports streaming Bluetooth audio to a wireless device over a Wi-Fi link, according to various aspects of the present disclosure.

FIG. 9 shows a timing diagram depicting another example wireless communication 900 that supports streaming Bluetooth audio to a wireless device over a Wi-Fi link, according to various aspects of the present disclosure. In some implementations, the wireless communication 900 may be performed between the AP 810, the wireless device 820, and the peripheral device 830 described with reference to FIG. 8. The wireless communication 900 is similar to the wireless communication 800 of FIG. 8, except that the TWT operation 900 depicted in the example of FIG. 9 is a restricted TWT (r-TWT) operation defined, for example, in the 802.11be and later amendments to the IEEE 802.11 family of wireless communication standards.

The restricted TWT operation allows the AP 810 to establish one or more r-TWT SPs that can be used to provide more predictable latency, reduced worst case latency, reduced jitter, and higher reliability for latency-sensitive traffic. For example, all STAs that support restricted TWT operation that are TXOP holders outside of any r-TWT SP for which they are not a member to end their respective TXOPs before the start of the r-TWT SP. In some aspects, membership in a r-TWT SP may be reserved exclusively for STAs associated with latency-sensitive traffic.

In the example of FIG. 9, the streaming media associated with the peripheral device 830 is latency-sensitive traffic, and the STA of the wireless device 820 is a member of the r-TWT operation. In the example of FIG. 9, the softAP of the wireless device 820 sends a Start message to the peripheral device 830, at time $t_0$. As discussed with reference to FIG. 8, the Start message may indicate that the peripheral device 830 is to begin streaming audio to the wireless device 820 over the wireless link 850 at a specified time.

At time $t_1$, the STA of the wireless device 820 transmits a TWT request frame over the wireless medium to the AP 810. The TWT request frame may request the AP 810 to schedule one or more r-TWT SPs on the wireless medium for latency-sensitive traffic associated with the peripheral device 830. The TWT request frame may include a TWT element indicating one or more proposed TWT parameters for the requested TWT SPs. In some aspects, the TWT request frame may indicate the MAC addresses of the STA, the softAP, and the peripheral device 830.

The AP 810 receives the TWT request frame, decodes the proposed TWT parameters, and determines whether to accept, modify, or reject the proposed TWT parameters. In the example of FIG. 9, the AP 810 accepts the proposed TWT parameters, and transmits a TWT response frame to the STA at time $t_2$. The TWT response frame may confirm the TWT parameters, may indicate that the STA is a member of the TWT operation, and may include a schedule indicating one or more times at which the peripheral device 830 is to transmit the media stream. The STA receives the TWT response frame, and remains awake to receive a trigger frame from the AP 810.

At time $t_3$, which corresponds to the start of the first r-TWT SP, the AP 810 transmits a first MU-RTS TXS trigger frame to the STA. The first MU-RTS TXS trigger frame may allocate a portion of the TXOP obtained by the AP 810 to the STA of the wireless device 820 for latency-sensitive communications. In some instances, the first MU-RTS TXS trigger frame may include a duration field set to the time period of the TXOP sharing mode, for example, so that other wireless devices that receive the first MU-RTS TXS trigger frame set their respective NAVs to the indicated time period (and therefore do not attempt for gain channel access during the indicated time period). In some aspects, the first MU-RTS TXS trigger frame may include the MAC addresses of the softAP of the wireless device 820 and the peripheral device 830, for example, so that the softAP and the peripheral device 830 do not set their respective NAVs to the indicated time period.

The STA of the wireless device 820 receives the first MU-RTS TXS trigger frame between times $t_3$ and $t_4$, and acknowledges reception of the first MU-RTS TXS trigger frame by transmitting a CTS frame to the AP 810 at time $t_4$. In some instances, the CTS frame includes the MAC addresses of the softAP and the peripheral device 830, for example, so that the softAP and the peripheral device 830 do not set their respective NAVs to the time period indicated in the duration field of the CTS frame. In this way, the CTS frame may prevent the peripheral device 830 from entering a power save mode or sleep state after detecting the CTS frame, thereby ensuring that the peripheral device 830 remains awake to stream media to the wireless device 820 over the link 850 during the TXOP sharing mode associated with the first r-TWT SP.

At time $t_5$, the softAP of the wireless device 820 transmits a trigger frame over the wireless link 850 to the peripheral device 830. The trigger frame, which may be a Basic trigger frame, solicits streaming audio from the peripheral device 830. The peripheral device 830 receives the trigger frame, and transmits an audio stream to the wireless device 820 over the wireless link 850 between times $t_8$ and $t_7$.

The wireless device 820 receives the first and second audio streams from the peripheral device 830, and may determine whether or not the first and second audio streams are rate-matched and temporally aligned with each other based on their respective TTP values and RTP sequence numbers. When the first and second audio samples are rate-matched and temporally aligned with each other, the first and second audio streams may collectively form a stereo audio stream that can be played for a user, or transmitted to another device, without additional rate-matching or audio sample alignment.

At time $t_8$, the softAP of the wireless device 820 acknowledges reception of the first and second audio streams by transmitting an ACK frame to the peripheral device 830. At time $t_9$, the first r-TWT SP ends, and is followed by a TWT SI between times $t_9$ and $t_{10}$. As discussed, the TWT SI may correspond to a quiet time or sleep period during which one or both of the wireless device 820 and the peripheral device 830 may enter a power save mode or sleep state to reduce power consumption. In some instances, the wireless device 820 and the peripheral device 830 wake from respective power save modes or sleep states prior to the start of the second r-TWT SP, at time $t_{10}$.

At time $t_{10}$, the AP 810 transmits a second MU-RTS TXS trigger frame over the wireless medium. The STA of the wireless device 820 receives the second MU-RTS TXS trigger frame between times $t_{10}$ and $t_{11}$, and acknowledges reception of the second MU-RTS TXS trigger frame by transmitting a CTS frame to the AP 810 at time $t_{11}$. In some instances, the CTS frame includes the MAC addresses of the softAP and the peripheral device 830, for example, so that the softAP and the peripheral device 830 do not set their respective NAVs to the time period indicated in the duration field of the CTS frame. In this way, the CTS frame may prevent the peripheral device 830 from entering a power save mode or sleep state after detecting the CTS frame, thereby ensuring that the peripheral device 830 remains awake to stream media to the wireless device 820 over the link 850 during the TXOP sharing mode associated with the second r-TWT SP.

At time $t_{12}$, the softAP of the wireless device 820 transmits a trigger frame over the wireless link 850 to the peripheral device 830. The trigger frame, which may be a Basic trigger frame, solicits streaming audio from the peripheral device 830. The peripheral device 830 receives the trigger frame between times $t_{12}$ and $t_{13}$, and transmits an audio stream to the wireless device 820 over the wireless link 850 between times $t_{13}$ and $t_{14}$.

The softAP of the wireless device 820 receives the first and second audio streams from the peripheral device 830, and may determine whether or not the first and second audio streams are rate-matched and temporally aligned with each other based on their respective TTP values and RTP sequence numbers. As discussed, when the first and second audio samples are rate-matched and temporally aligned with each other, the first and second audio streams may collectively form a stereo audio stream that can be played for a user, or transmitted to another device, without additional rate-matching or audio sample alignment.

At time $t_{15}$, the softAP of the wireless device 820 acknowledges reception of the first and second audio streams by transmitting an ACK frame to the peripheral device 830. At time $t_{16}$, the second r-TWT SP ends, and is followed by a TWT SI corresponding to a quiet time or sleep period during which one or both of the wireless device 820 and the peripheral device 830 may enter a power save mode or sleep state to reduce power consumption. The communications 900 associated with the r-TWT operation depicted in FIG. 9 may continue as described above for zero or more r-TWT SPs.

Figure 10:
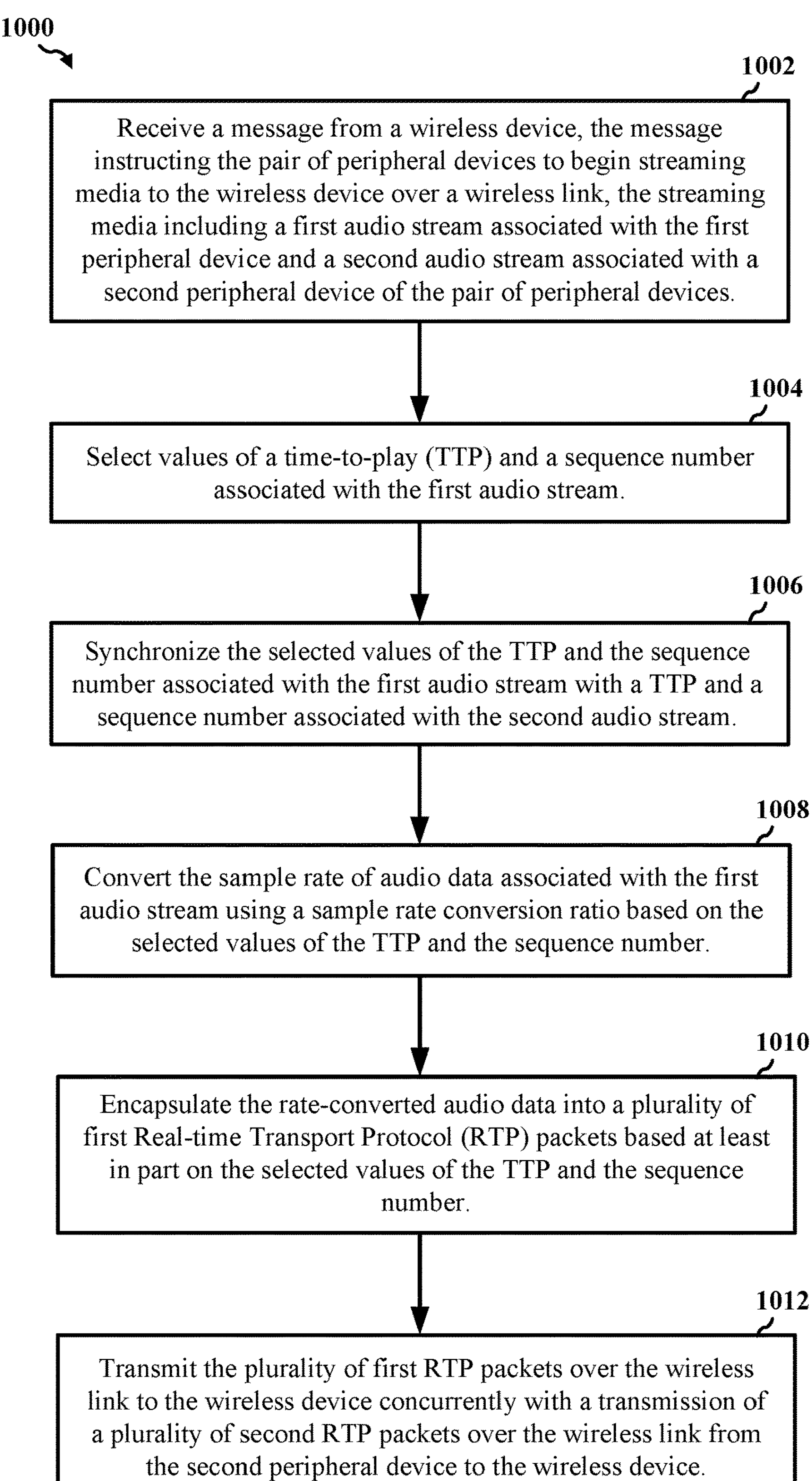
FIGS. 10-14 show flowcharts illustrating example operations for wireless communications that support streaming Bluetooth audio to a wireless device over a Wi-Fi link, according to various aspects of the present disclosure.

FIG. 10 shows a flowchart illustrating an example operation 1000 for wireless communication that supports streaming Bluetooth audio to a wireless device over a Wi-Fi link, according to various aspects of the present disclosure. The operation 1000 may be performed by a first peripheral device of a pair of peripheral devices associated with the wireless device. In some implementations, the first peripheral device may be an implementation of the earbud 112 of FIG. 1, one of the earbuds 420 of FIGS. 4A-4B, one of the earbuds 520 of FIGS. 5A-5B, or the first earbud 701 of FIG. 7. The second peripheral device may be an implementation of the earbud 112 of FIG. 1, the other earbud 420 of FIGS. 4A-4B, the other earbud 520 of FIGS. 5A-5B, or the second earbud 702 of FIG. 7. In some instances, the peripheral devices may have a Bluetooth connection with the wireless device, and may also be configured to transmit streaming media to, and receive streaming media from, the wireless device over a non-Bluetooth wireless link using the BToIP protocol disclosed herein. Further, in various aspects, the wireless device may be configured to operate as a wireless station (STA) associated with an access point (AP) operating on the Wi-Fi channel, while also operating as a softAP associated with the peripheral devices over the Wi-Fi channel or link.

For example, at 1002, the first peripheral device may receive a message from the wireless device, the message instructing the pair of peripheral devices to begin streaming media to the wireless device over a wireless link. The streaming media may include a first audio stream associated with the first peripheral device and a second audio stream associated with a second peripheral device of the pair of peripheral devices. At 1004, the first peripheral device may select values of a time-to-play (TTP) and a sequence number associated with the first audio stream. At 1006, the first peripheral device may synchronize the selected values of the TTP and the sequence number associated with the first audio stream with a TTP and a sequence number associated with the second audio stream. At 1008, the first peripheral device may convert the sample rate of audio data associated with the first audio stream using a sample rate conversion ratio based on the selected values of the TTP and the sequence number. At 1010, the first peripheral device may encapsulate the rate-converted audio data into a plurality of first Real-time Transport Protocol (RTP) packets based at least in part on the selected values of the TTP and the sequence number. At 1012, the first peripheral device may transmit the plurality of first RTP packets over the wireless link to the wireless device concurrently with a transmission of a plurality of second RTP packets over the wireless link from the second peripheral device to the wireless device.

In some implementations, the first peripheral device may be a primary earbud, the second peripheral device may be a secondary earbud, and the first and second audio streams collectively form stereo audio. In some instances, the wireless link may be at least one of a peer-to-peer (P2P) link, a tunneled direct-link setup (TDLS) link, a Wi-Fi Direct link, a link associated with a Group Owner (GO), or a link associated with a Neighborhood Area Network (NAN). In some aspects, the wireless link may be a wireless channel in a 2.4 GHz frequency band, a 5 GHz frequency band, or a 6 GHz frequency band.

In various aspects, each of the plurality of first RTP packets includes an RTP header indicating the TTP associated with the respective RTP packet, the sequence number associated with the respective RTP packet, and a synchronization source (SSRC) identifier corresponding to the first peripheral device. Similarly, each of the plurality of second RTP packets includes an RTP header indicating the TTP associated with the respective RTP packet, the sequence number associated with the respective RTP packet, and an SSRC identifier corresponding to the second peripheral device. In some instances, the sequence numbers and the SSRC identifiers carried in the streaming audio collectively indicate that audio data carried in the first audio stream is rate matched and temporally aligned with audio data carried in the second audio stream.

In some implementations, the first RTP packets correspond to the first audio stream and carry audio samples recorded by a microphone of the first peripheral device, and the second RTP packets correspond to the second audio stream and carry audio samples recorded by a microphone of the second peripheral device. In some instances, the audio samples carried in the first RTP packets are rate-matched with the audio samples carried in the second RTP packets based at least in part on the synchronized TTPs and sequence numbers.

In some instances, the streaming media is latency-sensitive traffic, and the RTP packets of the first and second audio streams are scheduled for transmission based on a restricted-TWT (r-TWT) operation. In some aspects, transmission of the streaming media may be solicited by a multi-user (MU) Request-to-Send (RTS) TXOP Sharing (TXS) trigger frame. In other instances, transmission of the streaming media may be solicited by an MU-RTS trigger frame.

Figure 11:
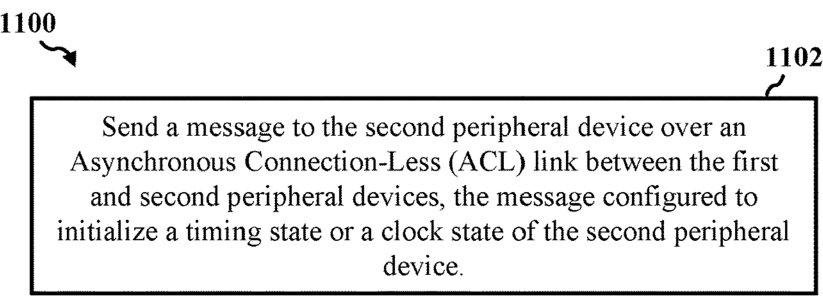

FIG. 11 shows a flowchart illustrating an example operation 1100 for wireless communication that supports streaming Bluetooth audio to a wireless device over a Wi-Fi link, according to various aspects of the present disclosure. The operation 1100 may be performed by the first peripheral device of the pair of peripheral devices described with reference to FIG. 10. As discussed, in some instances, the peripheral devices may have a Bluetooth connection with the wireless device, and may also be configured to transmit streaming media to, and receive streaming media from, the wireless device over a non-Bluetooth wireless link using the BToIP protocol disclosed herein.

In some instances, the operation 1100 may be one implementation of synchronizing the selected values of the TTP and the sequence number at 1006 in the operation 1000 of FIG. 10. For example, at 1102, the first peripheral device may send a message to the second peripheral device over an Asynchronous Connection-Less (ACL) link between the first and second peripheral devices. The message may be configured to initialize a timing state or a clock state of the second peripheral device (e.g., to the same initial timing state or clock state of the first peripheral device). In some instances, the message may be configured to adjust a sample rate conversion ratio used by the second peripheral device for rate-converting audio samples associated with the second audio stream.

Figure 12:
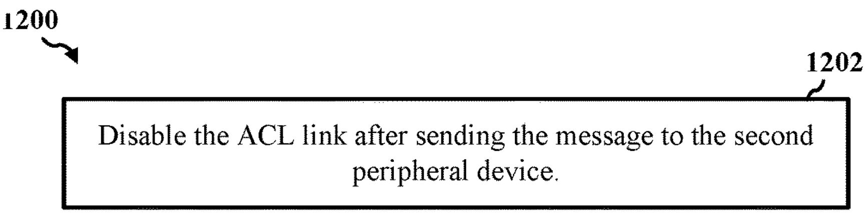

FIG. 12 shows a flowchart illustrating an example operation 1200 for wireless communication that supports streaming Bluetooth audio to a wireless device over a Wi-Fi link, according to various aspects of the present disclosure. The operation 1200 may be performed by the first peripheral device of the pair of peripheral devices described with reference to FIG. 10. As discussed, in some instances, the peripheral devices may have a Bluetooth connection with the wireless device, and may also be configured to transmit streaming media to, and receive streaming media from, the wireless device over a non-Bluetooth wireless link using the BToIP protocol disclosed herein.

In some instances, the operation 1200 may be performed after sending the message at 1102 in the operation 1100 of FIG. 11. For example, at 1202, the first peripheral device may disable the ACL link after sending the message to the second peripheral device. In some instances, the ACL link may be allowed to de-rate after the message is received by the second peripheral device, which may reduce power consumption of one or both of the first peripheral device and the second peripheral device. In some aspects, values for the TTP and sequence number may be adjusted based on a local clock of the first peripheral device, rather than on a shared clock, when the ACL link is inactive.

Figure 13:
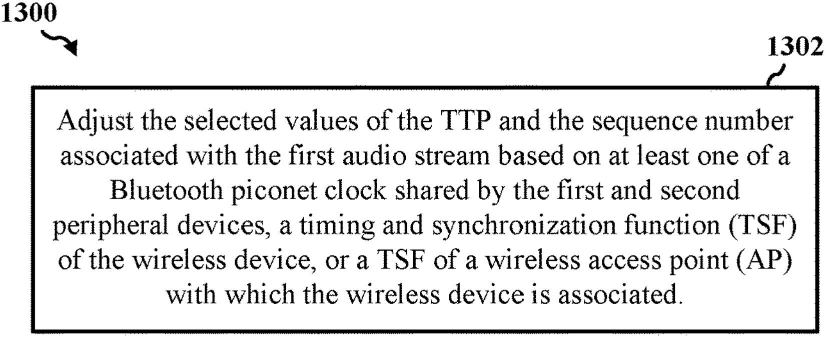

FIG. 13 shows a flowchart illustrating an example operation 1300 for wireless communication that supports streaming Bluetooth audio to a wireless device over a Wi-Fi link, according to various aspects of the present disclosure. The operation 1300 may be performed by the first peripheral device of the pair of peripheral devices described with reference to FIG. 10. As discussed, in some instances, the peripheral devices may have a Bluetooth connection with the wireless device, and may also be configured to transmit streaming media to, and receive streaming media from, the wireless device over a non-Bluetooth wireless link using the BToIP protocol disclosed herein.

In some instances, the operation 1300 may be performed in conjunction with the operation 1000 of FIG. 10. For example, at 1302, the first peripheral device may adjust the selected values of the TTP and the sequence number associated with the first audio stream based on at least one of a Bluetooth piconet clock shared by the first and second peripheral devices, a timing and synchronization function (TSF) of the wireless device, or a TSF of a wireless access point (AP) with which the wireless device is associated. That is, rather than using a local clock on the first peripheral device as a reference clock indicative of offsets or drifting of the TTP values and sequence numbers relative to a wall-clock, the first peripheral device may use the same clock as the second peripheral device to determine whether or not the TTP and/or sequence numbers should be adjusted.

Figure 14:
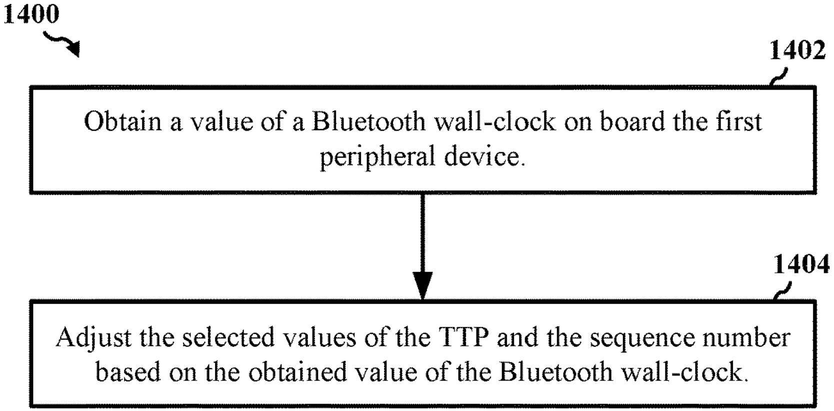

FIG. 14 shows a flowchart illustrating an example operation 1400 for wireless communication that supports streaming Bluetooth audio to a wireless device over a Wi-Fi link, according to various aspects of the present disclosure. The operation 1400 may be performed by the first peripheral device of the pair of peripheral devices described with reference to FIG. 10. As discussed, in some instances, the peripheral devices may have a Bluetooth connection with the wireless device, and may also be configured to transmit streaming media to, and receive streaming media from, the wireless device over a non-Bluetooth wireless link using the BToIP protocol disclosed herein.

In some instances, the operation 1400 may be performed in conjunction with the operation 1000 of FIG. 10. For example, at 1402, the first peripheral device may obtain a value of a Bluetooth wall-clock on board the first peripheral device. At 1404, the first peripheral device may adjust the selected values of the TTP and the sequence number based on the obtained value of the Bluetooth wall-clock. In this way, the first peripheral device can synchronize the TTP and/or sequence numbers associated with the first audio stream with the independent Bluetooth wall-clock. In some instances, the first peripheral device can synchronize its Bluetooth wall-clock with the Bluetooth wall-clock of the second peripheral device, and the second peripheral device can synchronize the TTP and/or sequence numbers associated with the second audio stream with the Bluetooth wall-clock of the second peripheral device (which is synchronized with the Bluetooth wall-clock of the first peripheral device).

Figure 15:
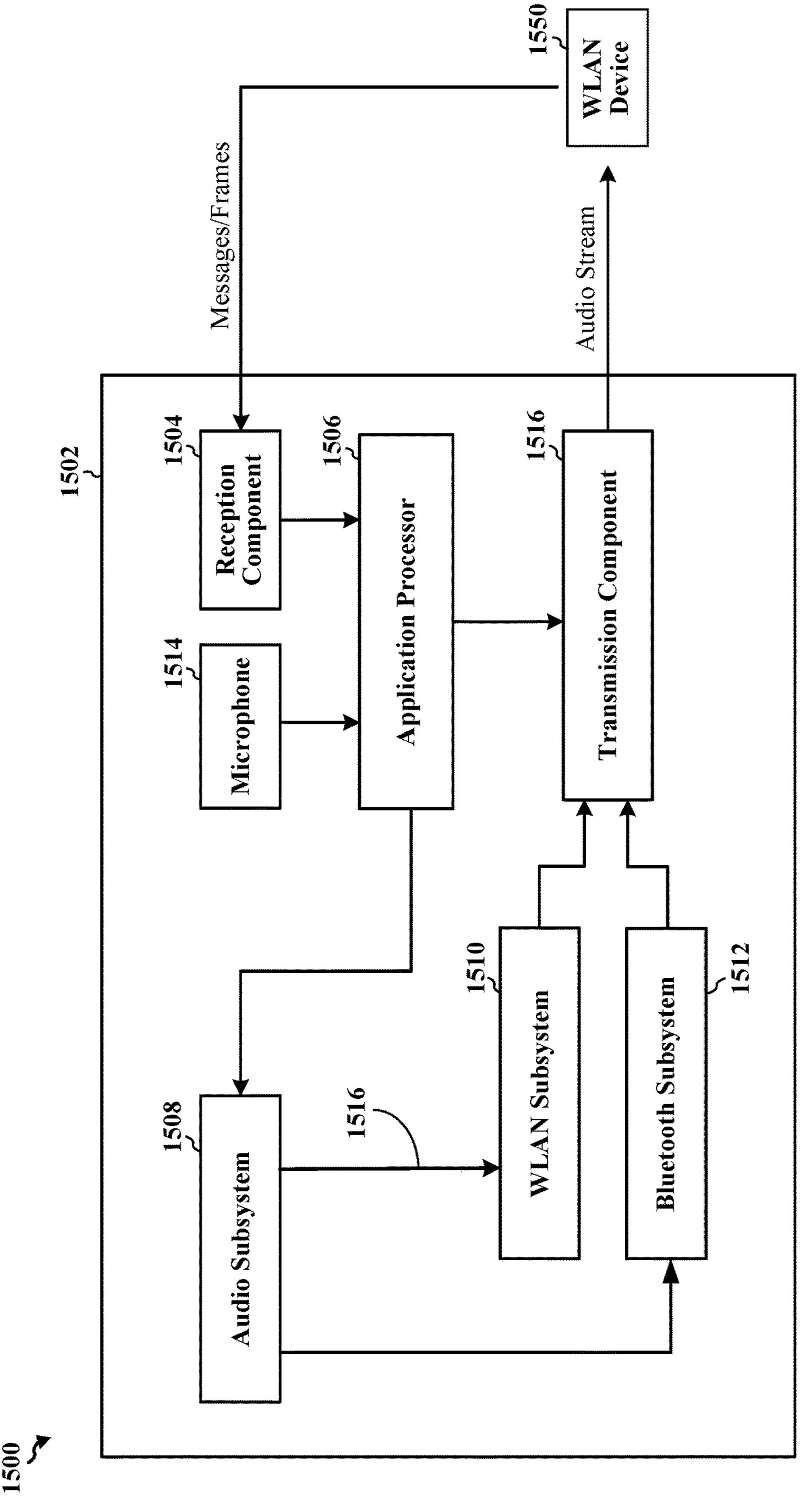
FIG. 15 shows a conceptual data flow diagram illustrating the data flow between different means/components in an example apparatus.

FIG. 15 is a conceptual data flow diagram 1500 illustrating the data flow between different means and/or components of an example apparatus 1502. In some implementations, the apparatus may be a first peripheral device of a pair of peripheral devices connected to a WLAN device 1550 via a Bluetooth connection. The WLAN device 1550 may operate as a wireless station (STA) associated with an access point (AP) operating on a Wi-Fi channel, while also operating as a softAP associated with the peripheral devices over the Wi-Fi channel or link. The apparatus 1502 includes a reception component 1504 that receives messages and frames from the WLAN device 1550. The apparatus 1502 also includes an application processor 1506, an audio subsystem 1508, a WLAN subsystem 1510, a Bluetooth subsystem 1512, a microphone 1514, and a transmission component 1516.

The microphone 1514 records or samples audio in a vicinity of the apparatus 1502, and forwards the resulting audio samples to the application processor 1506, which applies a Bluetooth profile to the audio samples. The audio subsystem 1508 encodes the audio samples, and routes the encoded audio samples to the WLAN subsystem 1510. The WLAN subsystem 1510 embeds the encoded audio data into RTP packets, and encapsulates the RTP packets within one or more IEEE 802.11-compliant data packets. The transmission component 1516 may transmit data packets carrying the audio samples to the WLAN device 1550 over the Wi-Fi channel or link based on the BToIP protocol described herein. The Bluetooth subsystem 1512 can establish a Bluetooth connection with the WLAN device 1550 and/or other peripheral devices, and can facilitate the transmission of Bluetooth packets to the WLAN device 1550 and/or the other peripheral devices over the established Bluetooth connection. The transmission component 1516 can transmit the Bluetooth packets to the WLAN device 1550 and/or the other peripheral devices. In some other instances, various aspects of the transmission component 1516 may be integrated within each of the WLAN subsystem 1510 and the Bluetooth subsystem 1512.

The apparatus may include additional components that perform each of the blocks of the algorithm in the flowcharts of FIGS. 10-14. As such, each block in the flowcharts of FIGS. 10-14 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 16:
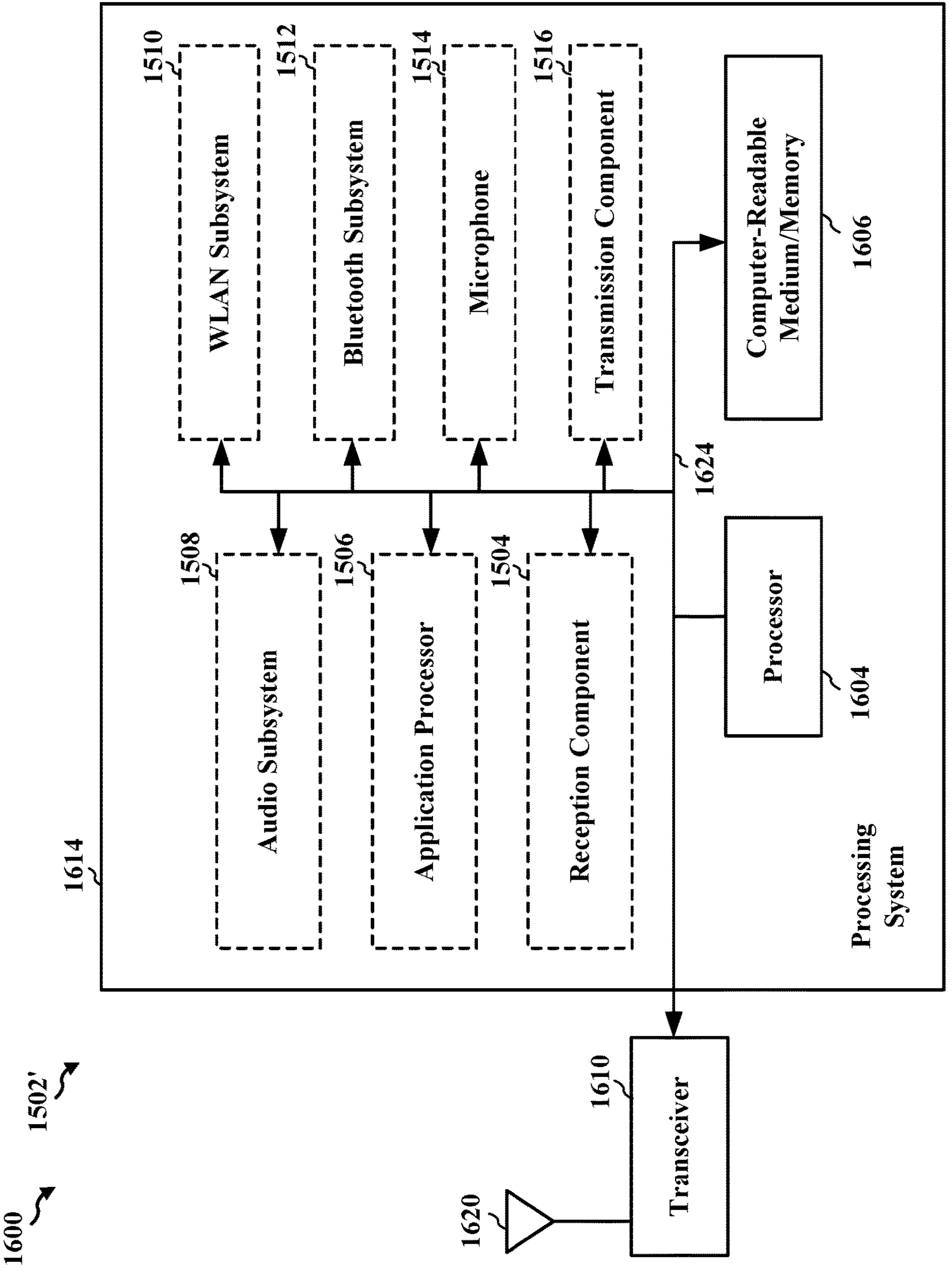
FIG. 16 shows a diagram illustrating an example of a hardware implementation for an apparatus employing a processing system.

FIG. 16 is a diagram 1600 illustrating an example of a hardware implementation for an apparatus 1502' employing a processing system 1614. The processing system 1614 may be implemented with a bus architecture, represented generally by the bus 1624. The bus 1624 may include any number of interconnecting buses and bridges depending on the specific application of the processing system 1614 and the overall design constraints. The bus 1624 links together various circuits including one or more processors and/or hardware components, represented by the processor 1604, the components 1504, 1506, 1508, 1510, 1512, 1514, and 1516 and the computer-readable medium/memory 1606. The bus 1624 may also link various other circuits such as timing sources, peripherals, voltage regulators, and power management circuits, which are well known in the art, and therefore, will not be described any further.

The processing system 1614 may be coupled to a transceiver 1610. The transceiver 1610 is coupled to one or more antennas 1620. The transceiver 1610 provides a means for communicating with various other apparatus over a wireless medium. The transceiver 1610 receives a signal from the one or more antennas 1620, extracts information from the received signal, and provides the extracted information to the processing system 1614, specifically the reception component 1504. In addition, the transceiver 1610 receives information from the processing system 1614, specifically the transmission component 1516, and based on the received information, generates a signal to be applied to the one or more antennas 1620. The processing system 1614 includes a processor 1604 coupled to a computer-readable medium/memory 1606. The processor 1604 is responsible for general processing, including the execution of software stored on the computer-readable medium/memory 1606. The software, when executed by the processor 1604, causes the processing system 1614 to perform the various functions described supra for any particular apparatus. The computer-readable medium/memory 1606 may also be used for storing data that is manipulated by the processor 1604 when executing software. The processing system 1614 further includes at least one of the components 1504, 1506, 1508, 1510, 1512, 1514, and 1516. The components may be software components running in the processor 1604, resident/stored in the computer readable medium/memory 1606, one or more hardware components coupled to the processor 1604, or some combination thereof.

In certain configurations, the apparatus 1502/1502' for wireless communication may include means for all means limitations described herein. The aforementioned means may be the processor(s) 202, the radio 230, the MMU 240, the WLAN controller 250, the Bluetooth controller 252, the WWAN controller 256, one or more of the aforementioned components of the apparatus 1502 and/or the processing system 1614 of the apparatus 1502' configured to perform the functions recited by the aforementioned means.

In one configuration, the apparatus 1502/1502' for wireless communication includes means for receiving a message from a wireless device, the message instructing the pair of peripheral devices to begin streaming media to the wireless device over a wireless link, the streaming media including a first audio stream associated with the first peripheral device and a second audio stream associated with a second peripheral device of the pair of peripheral devices; means for selecting values of a time-to-play (TTP) and a sequence number associated with the first audio stream; means for synchronizing the selected values of the TTP and the sequence number associated with the first audio stream with a TTP and a sequence number associated with the second audio stream; means for converting the sample rate of audio data associated with the first audio stream using a sample rate conversion ratio based on the selected values of the TTP and the sequence number; means for encapsulating the rate-converted audio data into a plurality of first Real-time Transport Protocol (RTP) packets based on the selected values of the TTP and the sequence number; and means for the plurality of first RTP packets over the wireless link to the wireless device concurrently with a transmission of a plurality of second RTP packets over the wireless link from the second peripheral device to the wireless device. The aforementioned means may be one or more of the aforementioned components of the apparatus 1502 and/or the processing system 1614 of the apparatus 1502' configured to perform the functions recited by the aforementioned means. As described supra, the processing system 1614 may include the processors 202, the memory 206, the flash memory 210, and/or the ROM 208 of FIG. 2.

Implementation examples are described in the following numbered clauses:

1. A method of wireless communication by a first peripheral device of a pair of peripheral devices, the method including:
   receiving a message from a wireless device, the message instructing the pair of peripheral devices to begin streaming media to the wireless device over a wireless link, the streaming media including a first audio stream associated with the first peripheral device and a second audio stream associated with a second peripheral device of the pair of peripheral devices;
   selecting values of a time-to-play (TTP) and a sequence number associated with the first audio stream;
   synchronizing the selected values of the TTP and the sequence number associated with the first audio stream with a TTP and a sequence number associated with the second audio stream;
   converting the sample rate of audio data associated with the first audio stream using a sample rate conversion ratio based on the selected values of the TTP and the sequence number;
   encapsulating the rate-converted audio data into a plurality of first Real-time Transport Protocol (RTP) packets based on the selected values of the TTP and the sequence number; and
   transmitting the plurality of first RTP packets over the wireless link to the wireless device concurrently with a transmission of a plurality of second RTP packets over the wireless link from the second peripheral device to the wireless device.
2. The method of clause 1, where the wireless link includes at least one of a peer-to-peer (P2P) link, a tunneled direct-link setup (TDLS) link, a Wi-Fi Direct link, a link associated with a Group Owner (GO), or a link associated with a Neighborhood Area Network (NAN).
3. The method of any one or more of clauses 1-2, where the wireless link includes a wireless channel in a 2.4 GHz frequency band, a 5 GHz frequency band, or a 6 GHz frequency band.
4. The method of any one or more of clauses 1-3, where the first RTP packets correspond to the first audio stream and carry audio data sampled by a microphone of the first peripheral device, and the second RTP packets correspond to the second audio stream and carry audio data sampled by a microphone of the second peripheral device.
5. The method of clause 4, where the audio data carried in the first RTP packets is rate-matched with the audio data carried in the second RTP packets based on the synchronized TTPs and sequence numbers.
6. The method of any one or more of clauses 1-5, where the first peripheral device is a primary earbud, the second peripheral device is a secondary earbud, and the first and second audio streams includes stereo audio.
7. The method of any one or more of clauses 1-6, where synchronizing the selected values of the TTP and the sequence number includes:
   sending a message to the second peripheral device over an Asynchronous Connection-Less (ACL) link between the first and second peripheral devices, the message configured to initialize a timing state or a clock state of the second peripheral device.
8. The method of clause 7, where the message is configured to adjust a sample rate conversion ratio used by the second peripheral device for rate-converting audio data associated with the second audio stream.
9. The method of clause 7, further including:
   disabling the ACL link after sending the message to the second peripheral device.
10. The method of any one or more of clauses 1-9, further including:
   adjusting the selected values of the TTP and the sequence number associated with the first audio stream based on at least one of a Bluetooth piconet clock shared by the first and second peripheral devices, a timing and synchronization function (TSF) of the wireless device, or a TSF of a wireless access point (AP) with which the wireless device is associated.
11. The method of any one or more of clauses 1-10, further including:

obtaining a value of a Bluetooth wall-clock on board the first peripheral device; and adjusting the selected values of the TTP and the sequence number based on the obtained value of the Bluetooth wall-clock.

12. The method of any one or more of clauses 1-11, where each of the plurality of first RTP packets includes an RTP header indicating:

the TTP associated with the respective RTP packet;

the sequence number associated with the respective RTP packet; and a synchronization source (SSRC) identifier corresponding to the first peripheral device.

13. The method of clause 12, where the sequence numbers and the SSRC identifiers carried in the streaming media collectively indicate that audio data carried in the first audio stream is rate matched and temporally aligned with audio data carried in the second audio stream.

14. The method of any one or more of clauses 1-13, where the first and second RTP packets are transmitted to the wireless device during a Target Wake Time (TWT) Service Period (SP).

15. The method of clause 14, where the first and second audio streams are latency-sensitive traffic, and the RTP packets associated with the first and second audio streams are scheduled for transmission based on a restricted-TWT (r-TWT) operation.

16. The method of clause 15, where transmission of the streaming media is solicited by a multi-user (MU) Request-to-Send (RTS) trigger frame or an MU-RTS TXOP Sharing (TXS) trigger frame.

17. A first peripheral device of a pair of peripheral devices, including:

one or more wireless radios;

one or more processors coupled to the one or more wireless radios;

a memory coupled to the one or more processors and storing instructions that, when executed by the one or more processors in conjunction with the one or more wireless radios, is configured to:

receive a message from a wireless device, the message instructing the pair of peripheral devices to begin streaming media to the wireless device over a wireless link, the streaming media including a first audio stream associated with the first peripheral device and a second audio stream associated with a second peripheral device of the pair of peripheral devices;

select values of a time-to-play (TTP) and a sequence number associated with the first audio stream;

synchronize the selected values of the TTP and the sequence number associated with the first audio stream with a TTP and a sequence number associated with the second audio stream;

convert the sample rate of audio data associated with the first audio stream using a sample rate conversion ratio based on the selected values of the TTP and the sequence number;

encapsulate the rate-converted audio data into a plurality of first Real-time Transport Protocol (RTP) packets based on the selected values of the TTP and the sequence number; and transmit the plurality of first RTP packets over the wireless link to the wireless device concurrently with a transmission of a plurality of second RTP packets, over the wireless link, from the second peripheral device to the wireless device.

18. The first peripheral device of clause 17, where the wireless link includes at least one of a peer-to-peer (P2P) link, a tunneled direct-link setup (TDLS) link, a Wi-Fi Direct link, a link associated with a Group Owner (GO), or a link associated with a Neighborhood Area Network (NAN).

19. The first peripheral device of any one or more of clauses 17-18, where the wireless link includes a wireless channel in a 2.4 GHz frequency band, a 5 GHz frequency band, or a 6 GHz frequency band.

20. The first peripheral device of any one or more of clauses 17-19, where the first RTP packets correspond to the first audio stream and carry audio data sampled by a microphone of the first peripheral device, and the second RTP packets correspond to the second audio stream and carry audio data sampled by a microphone of the second peripheral device.

21. The first peripheral device of clause 20, where the audio data carried in the first RTP packets is rate-matched with the audio data carried in the second RTP packets based on the synchronized TTPs and sequence numbers.

22. The first peripheral device of any one or more of clauses 17-21, where the first peripheral device is a primary earbud, the second peripheral device is a secondary earbud, and the first and second audio streams includes stereo audio.

23. The first peripheral device of any one or more of clauses 17-22, where execution of the instructions to synchronize the selected values of the TTP and the sequence number includes:

sending a message to the second peripheral device over an Asynchronous Connection-Less (ACL) link between the first and second peripheral devices, the message configured to initialize a timing state or a clock state of the second peripheral device.

24. The first peripheral device of clause 23, where the message is configured to adjust a sample rate conversion ratio used by the second peripheral device for rate-converting audio data associated with the second audio stream.

25. The first peripheral device of any one or more of clauses 17-24, where execution of the instructions is further configured to:

adjust the selected values of the TTP and the sequence number associated with the first audio stream based on at least one of a Bluetooth piconet clock shared by the first and second peripheral devices, a timing and synchronization function (TSF) of the wireless device, or a TSF of a wireless access point (AP) with which the wireless device is associated.

26. The first peripheral device of any one or more of clauses 17-25, where execution of the instructions is further configured to:

obtain a value of a Bluetooth wall-clock on board the first peripheral device; and adjust the selected values of the TTP and the sequence number based on the obtained value of the Bluetooth wall-clock.

27. The first peripheral device of any one or more of clauses 17-26, where each of the plurality of first RTP packets includes an RTP header indicating:

the TTP associated with the respective RTP packet;

the sequence number associated with the respective RTP packet; and a synchronization source (SSRC) identifier corresponding to the first peripheral device.

28. The first peripheral device of clause 27, where the sequence numbers and the SSRC identifiers carried in the streaming media collectively indicate that audio data carried in the first audio stream is rate matched and temporally aligned with audio data carried in the second audio stream.
29. The first peripheral device of any one or more of clauses 17-28, where the RTP packets associated with the first and second audio streams are transmitted to the wireless device during a Target Wake Time (TWT) Service Period (SP).
30. The first peripheral device of any one or more of clauses 17-28, where the first and second audio streams are latency-sensitive traffic, and the RTP packets associated with the first and second audio streams are scheduled for transmission based on a restricted Target Wake Time (r-TWT) operation.

As used herein, a phrase referring to "at least one of" or "one or more of" a list of items refers to any combination of those items, including single members. For example, "at least one of a, b, or c" is intended to cover the possibilities of: a only, b only, c only, a combination of a and b, a combination of a and c, a combination of b and c, and a combination of a and b and c.

The various illustrative components, logic, logical blocks, modules, circuits, operations, and algorithm processes described in connection with the implementations disclosed herein may be implemented as electronic hardware, firmware, software, or combinations of hardware, firmware, or software, including the structures disclosed in this specification and the structural equivalents thereof. The interchangeability of hardware, firmware and software has been described generally, in terms of functionality, and illustrated in the various illustrative components, blocks, modules, circuits and processes described herein. Whether such functionality is implemented in hardware, firmware or software depends upon the particular application and design constraints imposed on the overall system.

Various modifications to the implementations described in this disclosure may be readily apparent to persons having ordinary skill in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, various features that are described in this specification in the context of separate implementations also can be implemented in combination in a single implementation. Conversely, various features that are described in the context of a single implementation also can be implemented in multiple implementations separately or in any suitable subcombination. As such, although features may be described herein as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described herein should not be understood as requiring such separation in all implementations, and it should be understood that the described program components and systems can generally be integrated together in a single software product or packaged into multiple software products.

What is claimed is:

1. A method of wireless communication by a first peripheral device of a pair of peripheral devices, the method comprising:

receiving a message from a wireless device, the message instructing the pair of peripheral devices to begin streaming media to the wireless device over a wireless link, the streaming media including a first audio stream associated with the first peripheral device and a second audio stream associated with a second peripheral device of the pair of peripheral devices;

selecting values of a time-to-play (TTP) and a sequence number associated with the first audio stream;

synchronizing the selected values of the TTP and the sequence number associated with the first audio stream with a TTP and a sequence number associated with the second audio stream;

converting the sample rate of audio data associated with the first audio stream using a sample rate conversion ratio based on the selected values of the TTP and the sequence number;

encapsulating the rate-converted audio data into a plurality of first Real-time Transport Protocol (RTP) packets based at least in part on the selected values of the TTP and the sequence number; and transmitting the plurality of first RTP packets over the wireless link to the wireless device concurrently with a transmission of a plurality of second RTP packets over the wireless link from the second peripheral device to the wireless device.

2. The method of claim 1, wherein the wireless link comprises at least one of a peer-to-peer (P2P) link, a tunneled direct-link setup (TDLS) link, a Wi-Fi Direct link, a link associated with a Group Owner (GO), or a link associated with a Neighborhood Area Network (NAN).

3. The method of claim 1, wherein the wireless link comprises a wireless channel in a 2.4 GHz frequency band, a 5 GHz frequency band, or a 6 GHz frequency band.

4. The method of claim 1, wherein the first RTP packets correspond to the first audio stream and carry audio data sampled by a microphone of the first peripheral device, and the second RTP packets correspond to the second audio stream and carry audio data sampled by a microphone of the second peripheral device.

5. The method of claim 4, wherein the audio data carried in the first RTP packets is rate-matched with the audio data carried in the second RTP packets based on the synchronized TTPs and sequence numbers.

6. The method of claim 1, wherein the first peripheral device is a primary earbud, the second peripheral device is a secondary earbud, and the first and second audio streams comprises stereo audio.

7. The method of claim 1, wherein synchronizing the selected values of the TTP and the sequence number includes:

sending a message to the second peripheral device over an Asynchronous Connection-Less (ACL) link between the first and second peripheral devices, the message configured to initialize a timing state or a clock state of the second peripheral device.

8. The method of claim 7, wherein the message is configured to adjust a sample rate conversion ratio used by the second peripheral device for rate-converting audio data associated with the second audio stream.

9. The method of claim 7, further comprising:

disabling the ACL link after sending the message to the second peripheral device.

10. The method of claim 1, further comprising:

adjusting the selected values of the TTP and the sequence number associated with the first audio stream based on at least one of a Bluetooth piconet clock shared by the first and second peripheral devices, a timing and synchronization function (TSF) of the wireless device, or a TSF of a wireless access point (AP) with which the wireless device is associated.

11. The method of claim 1, further comprising:

obtaining a value of a Bluetooth wall-clock on board the first peripheral device; and adjusting the selected values of the TTP and the sequence number based on the obtained value of the Bluetooth wall-clock.

12. The method of claim 1, wherein each of the plurality of first RTP packets includes an RTP header indicating:

the TTP associated with the respective RTP packet;

the sequence number associated with the respective RTP packet; and a synchronization source (SSRC) identifier corresponding to the first peripheral device.

13. The method of claim 12, wherein the sequence numbers and the SSRC identifiers carried in the streaming media collectively indicate that audio data carried in the first audio stream is rate matched and temporally aligned with audio data carried in the second audio stream.

14. The method of claim 1, wherein the first and second RTP packets are transmitted to the wireless device during a Target Wake Time (TWT) Service Period (SP).

15. The method of claim 14, wherein the first and second audio streams are latency-sensitive traffic, and the RTP packets associated with the first and second audio streams are scheduled for transmission based on a restricted-TWT (r-TWT) operation.

16. The method of claim 15, wherein transmission of the streaming media is solicited by a multi-user (MU) Request-to-Send (RTS) trigger frame or an MU-RTS TXOP Sharing (TXS) trigger frame.

17. A first peripheral device of a pair of peripheral devices, comprising:

one or more wireless radios;

one or more processors coupled to the one or more wireless radios;

a memory coupled to the one or more processors and storing instructions that, when executed by the one or more processors in conjunction with the one or more wireless radios, is configured to:

receive a message from a wireless device, the message instructing the pair of peripheral devices to begin streaming media to the wireless device over a wireless link, the streaming media including a first audio stream associated with the first peripheral device and a second audio stream associated with a second peripheral device of the pair of peripheral devices;

select values of a time-to-play (TTP) and a sequence number associated with the first audio stream;

synchronize the selected values of the TTP and the sequence number associated with the first audio stream with a TTP and a sequence number associated with the second audio stream;

convert the sample rate of audio data associated with the first audio stream using a sample rate conversion ratio based on the selected values of the TTP and the sequence number;

encapsulate the rate-converted audio data into a plurality of first Real-time Transport Protocol (RTP) packets based at least in part on the selected values of the TTP and the sequence number; and transmit the plurality of first RTP packets over the wireless link to the wireless device concurrently with a transmission of a plurality of second RTP packets over the wireless link from the second peripheral device to the wireless device.

18. The first peripheral device of claim 17, wherein the wireless link comprises at least one of a peer-to-peer (P2P) link, a tunneled direct-link setup (TDLS) link, a Wi-Fi Direct link, a link associated with a Group Owner (GO), or a link associated with a Neighborhood Area Network (NAN).

19. The first peripheral device of claim 17, wherein the wireless link comprises a wireless channel in a 2.4 GHz frequency band, a 5 GHz frequency band, or a 6 GHz frequency band.

20. The first peripheral device of claim 17, wherein the first RTP packets correspond to the first audio stream and carry audio data sampled by a microphone of the first peripheral device, and the second RTP packets correspond to the second audio stream and carry audio data sampled by a microphone of the second peripheral device.

21. The first peripheral device of claim 20, wherein the audio data carried in the first RTP packets is rate-matched with the audio data carried in the second RTP packets based on the synchronized TTPs and sequence numbers.

22. The first peripheral device of claim 17, wherein the first peripheral device is a primary earbud, the second peripheral device is a secondary earbud, and the first and second audio streams comprises stereo audio.

23. The first peripheral device of claim 17, wherein execution of the instructions to synchronize the selected values of the TTP and the sequence number includes:

sending a message to the second peripheral device over an Asynchronous Connection-Less (ACL) link between the first and second peripheral devices, the message configured to initialize a timing state or a clock state of the second peripheral device.

24. The first peripheral device of claim 23, wherein the message is configured to adjust a sample rate conversion ratio used by the second peripheral device for rate-converting audio data associated with the second audio stream.

25. The first peripheral device of claim 17, wherein execution of the instructions is further configured to:

adjust the selected values of the TTP and the sequence number associated with the first audio stream based on at least one of a Bluetooth piconet clock shared by the first and second peripheral devices, a timing and synchronization function (TSF) of the wireless device, or a TSF of a wireless access point (AP) with which the wireless device is associated.

26. The first peripheral device of claim 17, wherein execution of the instructions is further configured to:

obtain a value of a Bluetooth wall-clock on board the first peripheral device; and adjust the selected values of the TTP and the sequence number based on the obtained value of the Bluetooth wall-clock.

27. The first peripheral device of claim 17, wherein each of the plurality of first RTP packets includes an RTP header indicating:

the TTP associated with the respective RTP packet;

the sequence number associated with the respective RTP packet; and a synchronization source (SSRC) identifier corresponding to the first peripheral device.

28. The first peripheral device of claim 27, wherein the sequence numbers and the SSRC identifiers carried in the streaming media collectively indicate that audio data carried in the first audio stream is rate matched and temporally aligned with audio data carried in the second audio stream.

29. The first peripheral device of claim 17, wherein the RTP packets associated with the first and second audio streams are transmitted to the wireless device during a Target Wake Time (TWT) Service Period (SP).

30. The first peripheral device of claim 17, wherein the first and second audio streams are latency-sensitive traffic, and the RTP packets associated with the first and second audio streams are scheduled for transmission based on a restricted Target Wake Time (r-TWT) operation.

* * * * *